(12) United States Patent
Kamiya et al.

(10) Patent No.: US 7,508,478 B2
(45) Date of Patent: Mar. 24, 2009

(54) DISPLAY APPARATUS

(75) Inventors: Kiyoshi Kamiya, Sayama (JP); Eiichi Tajima, Iruma (JP); Isao Ochi, Tokorozawa (JP)

(73) Assignee: Citizen Holdings Co., Ltd., Tokyo (JP)

( * ) Notice: Subject to any disclaimer, the term of this patent is extended or adjusted under 35 U.S.C. 154(b) by 625 days.

(21) Appl. No.: 10/942,930

(22) Filed: Sep. 17, 2004

(65) Prior Publication Data

US 2005/0134549 A1  Jun. 23, 2005

(30) Foreign Application Priority Data

Sep. 18, 2003 (JP) .............................. 2003-325378
Mar. 12, 2004 (JP) .............................. 2004-069888

(51) Int. Cl.
*G02F 1/1343* (2006.01)

(52) U.S. Cl. .......................... 349/145; 349/144; 349/146

(58) Field of Classification Search .................. 349/145
See application file for complete search history.

(56) References Cited

U.S. PATENT DOCUMENTS 6,587,174 B1 * 7/2003 Nakano ....................... 349/139

FOREIGN PATENT DOCUMENTS

| JP | 59-119319 | 7/1984 |
| JP | 2-38071 | 2/1990 |
| JP | 5-17679 | 3/1993 |
| JP | 2000-352939 | 12/2000 |
| JP | 2001-184000 | 7/2001 |
| JP | 2003-222893 | 8/2003 |

\* cited by examiner

*Primary Examiner*—David Nelms
*Assistant Examiner*—David Y Chung
(74) *Attorney, Agent, or Firm*—Finnegan, Henderson, Farabow, Garrett & Dunner, L.L.P.

(57) ABSTRACT

In displaying a price label, the price can be displayed at low resolution without any problem, but a bar code requires a high resolution display. In view of this, the invention provides an electrode structure for a display apparatus that can suppress increases in cost and power consumption while preventing image quality degradation, even when a low-resolution display area and a high-resolution display area are mixed on the same display. A liquid crystal panel 10 has a main display section 11 and a sub-display section 12. In the main display section 11, pixels are arranged in a matrix pattern. In the sub display section 12, rectangle-shaped pixels are arranged in a single row, and the pixel pitch in the sub display section 12 is m/n of that in the main display section 11 (n and m are integers).

9 Claims, 12 Drawing Sheets

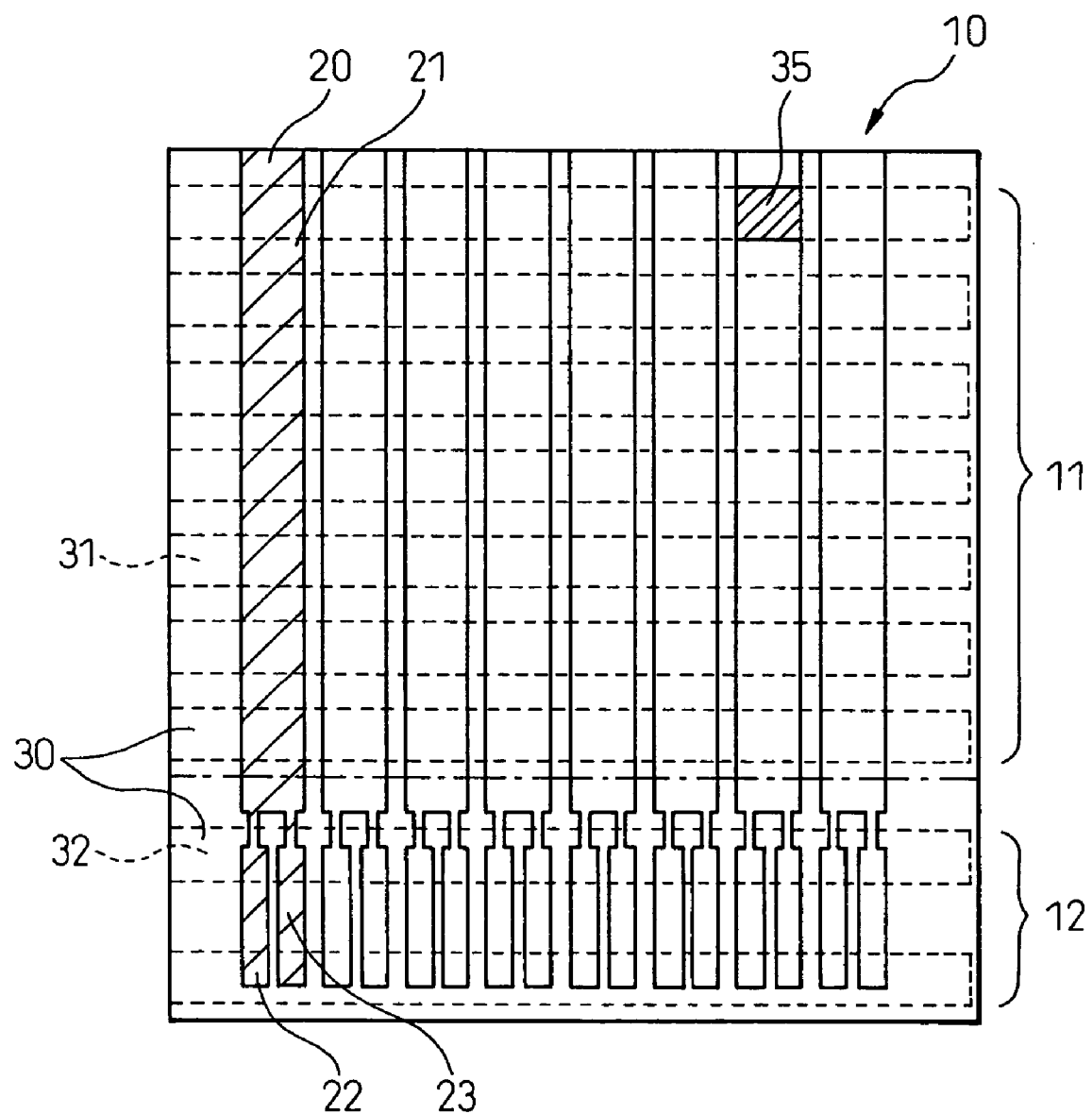

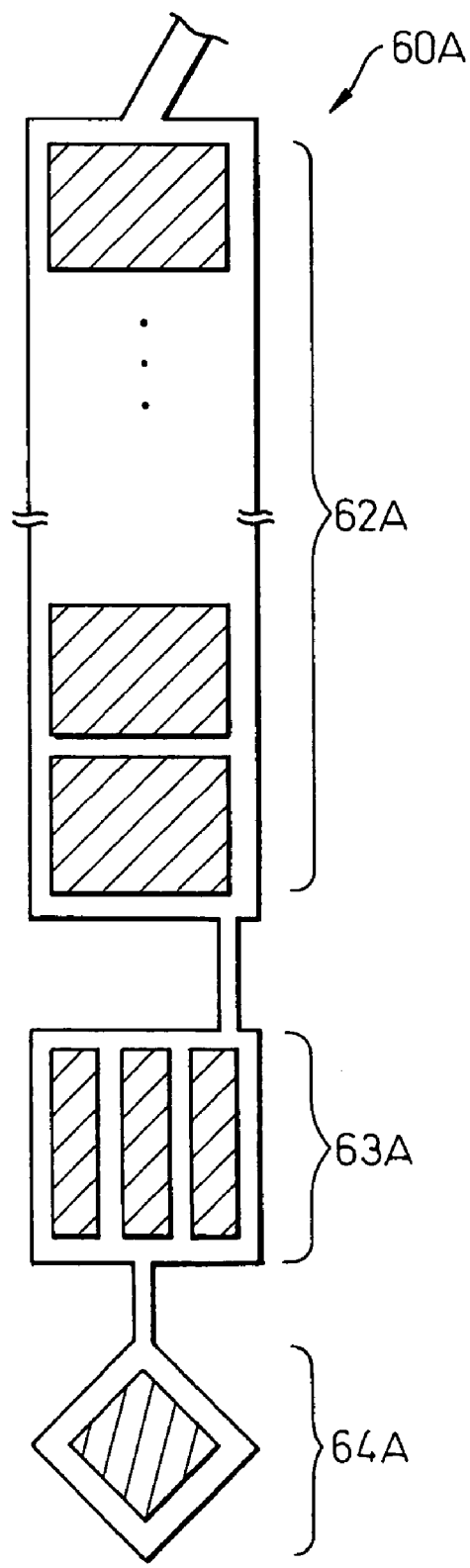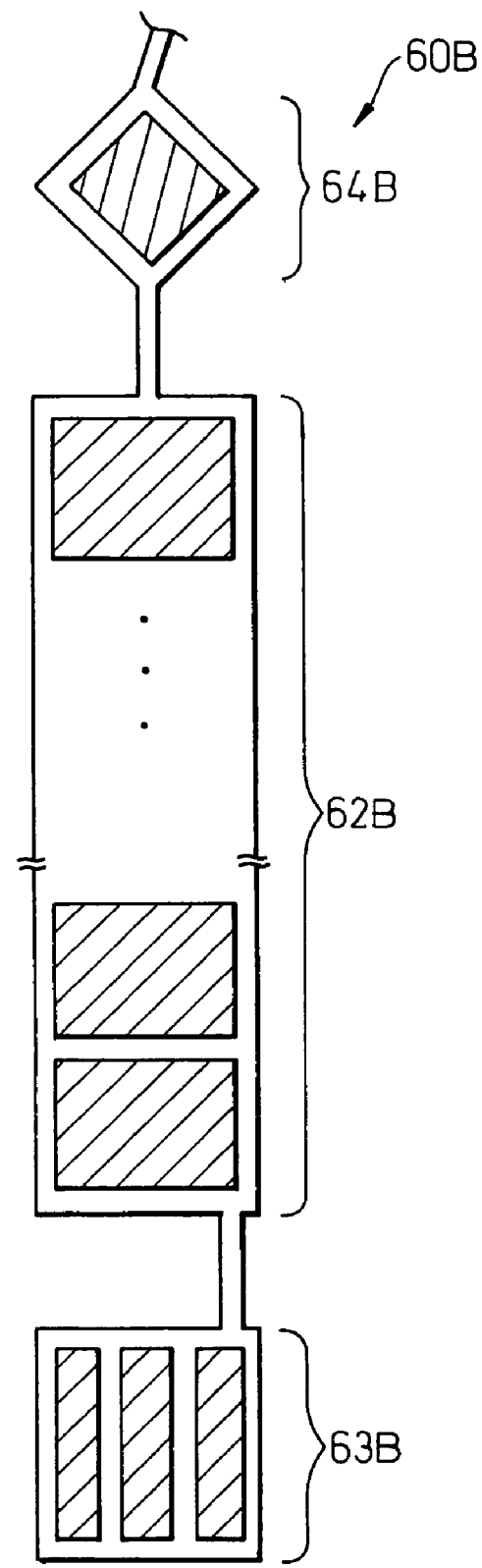

DISPLAY APPARATUS

CROSS-REFERENCE TO RELATED APPLICATION

This application claims priority from, and incorporates by reference the entire disclosure of, the following Japanese Patent Applications,
(1) No. 2003-325378, filed on Sep. 18, 2003.
(2) No. 2004-069888, filed on Mar. 12, 2004.

BACKGROUND OF THE INVENTION

1. Field of the Invention

The present invention relates to a display apparatus that produces a display by applying a voltage to an electro-optical conversion material and, more particularly, to a display apparatus having display areas of different resolutions, wherein the electro-optical conversion material is a liquid crystal material.

2. Description of the Related Art

In the fields of various measuring instruments, electronic shelf labeling systems, etc., it is practiced to produce a display of ordinary characters, graphics, or the like, which does not require a particularly high resolution, and a display of bar code or the like, which requires a high resolution, simultaneously on a single display panel.

Patent Document 1 (Japanese Examined Patent Publication No. H07-65909) discloses a technique for displaying a character screen, on which numerical values measured by a measuring instrument or various kinds of information are displayed in numbers or letters, and a bar code screen, on which the numerical values measured or the various kinds of information are displayed in bar code, simultaneously on a single display panel. However, with the technique disclosed in Patent Document 1, as the character screen and the bar code screen are displayed at the same resolution, the resolution of the display panel has had to be made to match the resolution required of the bar code display; that is, even when a low resolution suffices for the display of the character screen, the entire display panel has had to be designed to provide the high resolution required of the bar code display, resulting in the problem that the display panel requires the use of higher performance driving circuits, etc. and the cost increases unnecessarily.

A technique that addresses the above problem is disclosed in Patent Document 2 (Japanese Unexamined Patent Publication No. 2003-222893). The technique disclosed in Patent Document 2 concerns an electronic shelf labeling system that displays a matrix display section, in which ordinary characters are displayed, and a bar code display section, in which bar code is displayed by static driving, simultaneously on a single panel but at different resolutions. This display panel has a dot display section comprising column electrodes and row electrodes arranged in a matrix pattern, and a rectangular-segment display section comprising one common electrode and segment display electrodes disposed opposite the common electrode and electrically connected to the column electrodes in a one-to-one corresponding relationship. As the rectangular-segment display section is driven by the static driving method, the display panel as a whole is constructed using a liquid crystal material having a memory operation mode.

According to the technique disclosed in Patent Document 2, the dot display section for displaying ordinary character information is driven in time division fashion by using the column electrodes and row electrodes, while the segment display section for displaying bar code is driven by static driving (non-time-division driving) by using the one common electrode and the segment display electrodes disposed opposite to it. In this technique, a signal is input to each segment display electrode via its corresponding column electrode by electrically connecting the segment display electrode to the column electrode. This leaves no choice but to make the segment display electrodes correspond one for one with the column electrodes, leading to the problem that the number of segment display electrodes cannot be made larger than the number of column electrodes. There has also been the problem that, when the resolution of the segment display section is made higher than the resolution of the dot display section, a non-display area having no display pixels occurs in the segment display section and it is not possible to use that area for display. An object of the present invention is to solve these problems associated with Patent Document 2.

SUMMARY OF THE INVENTION

According to a first mode for carrying out the present invention, there is provided a display apparatus which comprises an electro-optical conversion material placed between a plurality of signal electrodes and a plurality of scanning electrodes, and which produces a display by changing optical properties of the electro-optical conversion material by applying a prescribed voltage to each of a plurality of display pixels formed where the signal electrodes overlap the scanning electrodes, wherein the plurality of display pixels are divided on each of the signal electrodes into at least two groups, one consisting of main display pixels and the other consisting of sub-display pixels, and wherein the main display pixels are arranged one spaced apart from another in a direction in which the scanning electrodes are scanned, and at least two of the sub-display pixels are arranged in overlapping fashion in the direction in which the scanning electrodes are scanned, and arranged one spaced apart from the other in a direction orthogonal to the direction in which the scanning electrodes are scanned.

In the display apparatus according to the first mode, each of the signal electrodes comprises a main signal electrode portion on which the main display pixels are formed, and sub-signal electrode portions connected to the main signal electrode portion and arranged one spaced apart from the other in the direction orthogonal to the scanning direction in corresponding relationship to the sub-display pixels.

In the display apparatus according to the first mode, the sub-signal electrode portions are connected to the main signal electrode portion by a portion formed in the shape of a narrow path.

In the display apparatus according to the first mode, the scanning electrodes are divided into two groups, one consisting of main scanning electrodes arranged in a main display section where the main display pixels are formed and the other consisting of sub-scanning electrodes arranged in a sub-display section where the sub-display pixels are formed, and the sub-scanning electrodes include at least an upper sub-scanning electrode and a lower sub-scanning electrodes, the upper and lower sub-scanning electrodes together comprising wiring electrode portions extending parallel to each other in the direction orthogonal to the scanning direction and a plurality of comb-shaped electrode portions protruding from the respective wiring electrode portions of the upper and lower sub scanning electrodes in directions opposing each other, wherein the comb-shaped electrode portions of the upper sub scanning electrode and the comb-shaped electrode portions of the lower sub scanning electrodes are arranged in alternating fashion in the direction orthogonal to the scanning direction.

In the display apparatus according to the first mode, the scanning electrodes forming the sub display pixels include a middle sub scanning electrode in addition to the upper sub scanning electrode and the lower sub scanning electrode, and the middle sub scanning electrode is disposed between the upper sub scanning electrode and the lower sub scanning electrode, and is formed in a corrugated shape to conform with the shapes of the upper sub scanning electrode and the lower sub scanning electrode.

In the display apparatus according to the first mode, interconnections for connecting the scanning electrodes and the signal electrodes to an external circuit that applies a prescribed voltage between the electrodes are provided on one side of a display substrate, and the one side of the substrate is located on a sub display pixel side.

According to a second mode for carrying out the present invention, there is provided a display apparatus comprising: a plurality of signal lines connected to a plurality of pixel electrodes via switching devices; a plurality of scanning lines for controlling the switching of the switching devices; a common electrode disposed opposite the plurality of pixel electrodes; and an electro-optical conversion material sandwiched between the common electrode and the pixel electrodes, wherein the plurality of pixel electrodes are divided on each of the signal lines into at least two groups, one consisting of main pixel electrodes and the other consisting of sub pixel electrodes, and wherein the main pixel electrodes are arranged one spaced apart from another in a direction in which the scanning lines are scanned, and at least two of the sub pixel electrodes are arranged in overlapping fashion in the direction in which the scanning lines are scanned, and arranged one spaced apart from the other in a direction orthogonal to the direction in which the scanning lines are scanned.

In the display apparatus according to the second mode, interconnections for connecting the pixel electrodes and the common electrode to an external circuit that applies a prescribed voltage between the electrodes are provided on one side of a display substrate, and the one side of the substrate is located on a sub display pixel side.

In the display apparatus according to the first and second modes, the electro-optical conversion material is a liquid crystal material.

The present invention has the effect of being able to set the number of pixels for a high-resolution display area independently of the number of signal lines in a display apparatus that has a plurality of signal lines (signal electrodes) and a plurality of scanning lines (scanning electrodes) and that produces a plurality of display areas of different resolutions on a single display panel by time division driving.

Furthermore, since there is no need to make the signal (pixel) electrodes in the main display section correspond one for one with the signal (pixel) electrodes in the sub display section, the present invention has the effect of being able to increase the number of sub-signal (pixel) electrodes beyond the number of main signal (pixel) electrodes, thereby making the pixel density (resolution) of the sub display section higher than that of the main display section; this offers the effect of being able to use the entire area of the sub display section as a display area without leaving any non-display areas having no display pixels in the sub display section.

BRIEF DESCRIPTION OF THE DRAWINGS

The present invention is illustrated by way of example, and not by limitation, in the figures of the accompanying drawings in which like reference numerals indicate similar element, in which:

The present invention will be more clearly understood from the description as set forth below with reference to the accompanying drawings, wherein:

FIG. 3 is a plan view of the liquid crystal panel according to the first embodiment.

FIG. 6C is an enlarged plan view of an essential portion of a signal electrode, showing a modified example of the signal electrode according to the fourth embodiment, in which the signal electrode comprises a main display portion, a first sub display portion, and a second sub display portion.

FIG. 6D is a diagram showing another modified example of the signal electrode in which the second sub display portion shown in FIG. 6C is disposed at the head of the main display portion.

DESCRIPTION OF THE PREFERRED EMBODIMENTS

The best mode for carrying out the invention will be described below with reference to first to eighth embodiments.

Embodiment 1

Figure 1A:
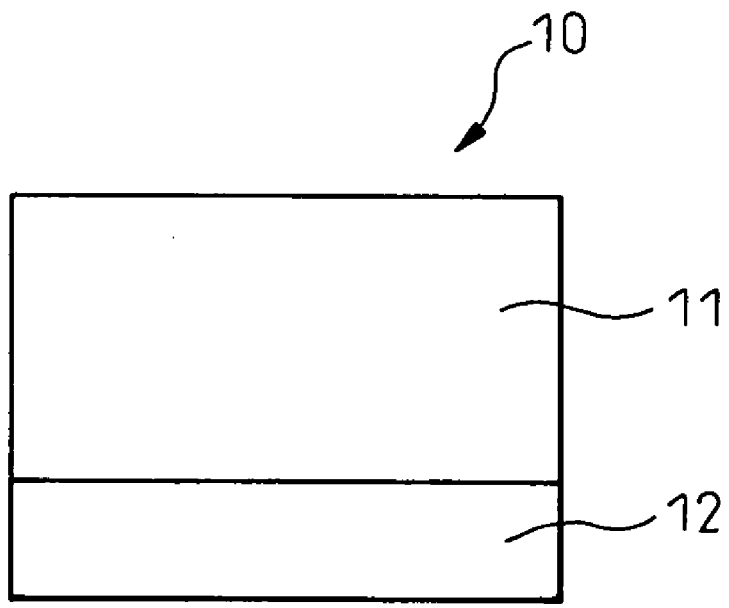
FIG. 1A is a plan view of a liquid crystal panel according to a first embodiment.
Figure 1B:
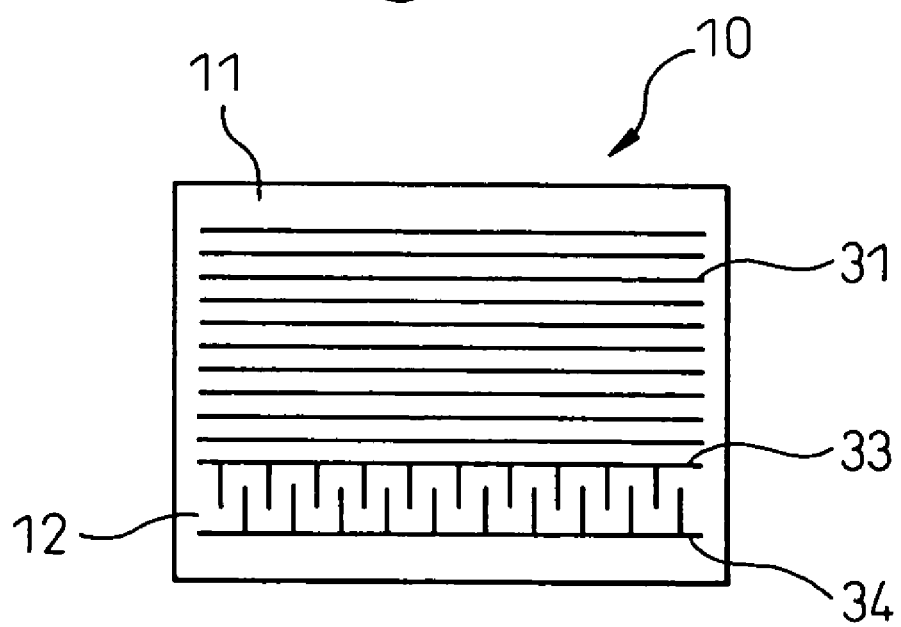
FIG. 1B is a plan view schematically showing an array of scanning electrodes in the liquid crystal panel according to the first embodiment.
Figure 2A:
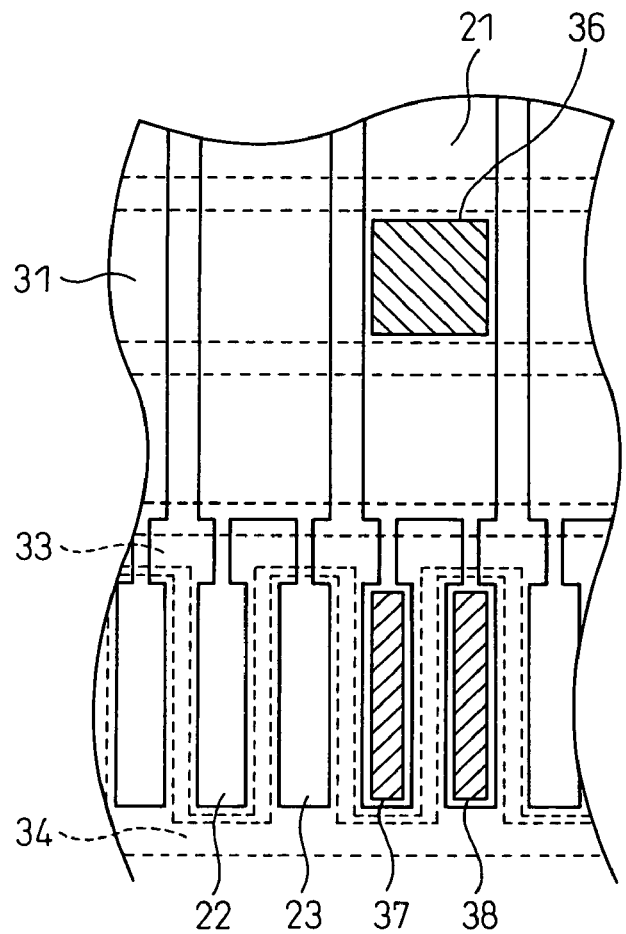
FIG. 2A is an enlarged plan view of an essential portion of some electrodes, showing the spatial relationship between signal electrodes and scanning electrodes according to the first embodiment.
Figure 2B:
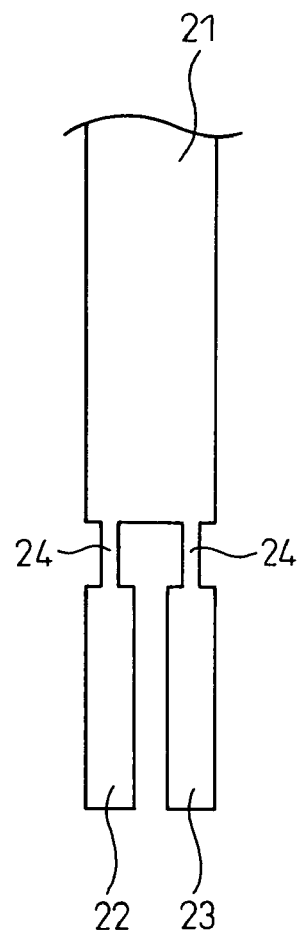
FIG. 2B is a diagram showing a signal electrode taken from FIG. 2A.
Figure 2C:
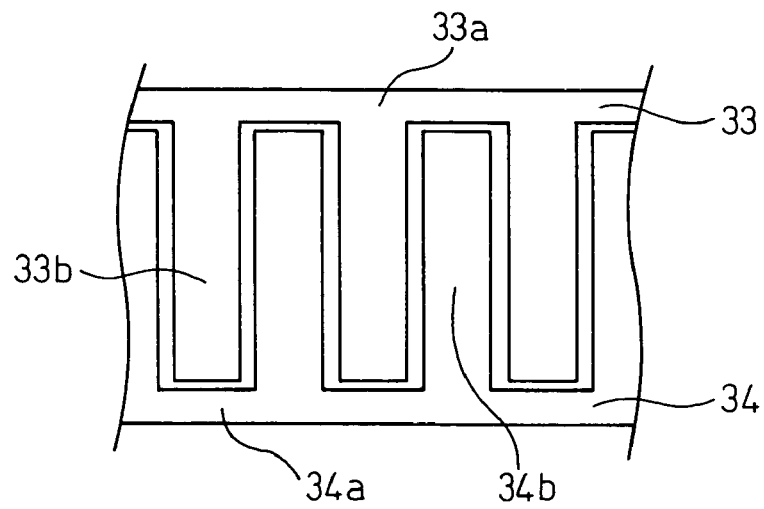
FIG. 2C is a diagram showing scanning electrodes in a sub display section 12 in FIG. 1A.

FIGS. 1, 2, and 3 are diagrams showing the first embodiment of the present invention. FIG. 1 shows a liquid crystal panel according to the first embodiment: FIG. 1A is a plan view of the liquid crystal panel, and FIG. 1B is a plan view schematically showing an array of scanning electrodes. FIG. 2 presents enlarged plan views showing essential portions of electrodes: FIG. 2A shows the spatial relationship between signal electrodes and scanning electrodes (their positional relationship as viewed from the top), FIG. 2B shows the plan shape of a signal electrode taken from FIG. 2A, and FIG. 2C shows the plan shape of a portion of the scanning electrodes in a sub display section. In FIG. 2, the sub display section is shown by reducing its size, top to bottom, for illustrative purposes. FIG. 3 is a plan view showing the liquid crystal panel of the first embodiment.

An outline of the liquid crystal panel 10 will be described with reference to FIG. 3. A main display section 11 capable of displaying numbers, letters, and other desired graphics is formed in the upper part of the liquid crystal panel 10, and the sub display section 12 for displaying bar code or the like in fixed characters is formed in the lower part. The liquid crystal panel 10 comprises two glass substrates overlaid one on top of the other (one on the front side and the other on the rear side of FIG. 3), with a plurality of transparent signal electrodes 20 and a plurality of transparent scanning electrodes 30 formed on the opposing surfaces of the respective substrates; a nematic type liquid crystal is sandwiched between these electrodes, forming display pixels at positions where the signal electrodes 20 overlap the scanning electrodes 30. The liquid crystal panel 10 of FIG. 3 is, for example, a liquid crystal panel employing the so-called passive driving scheme in which voltage application to each display pixel 35 (hatched portion) is accomplished, not by means of a switching device, but by applying a voltage in time division fashion to the corresponding signal electrode 20 and scanning electrode 30. In the embodiments of the present invention, glass substrates are used, but alternatively, film substrates may be used.

The plurality of signal electrodes 20 (one indicated by hatching), each identical in shape and extending in the longitudinal direction (in the vertical direction in FIG. 3), are arranged at equally spaced intervals in the latitudinal direction (in the horizontal direction in FIG. 3). The scanning electrodes 30 are formed extending in the latitudinal direction of the signal electrodes 20, and are arranged at equally spaced intervals in the longitudinal direction of the signal electrodes 20. Each signal electrode 20 comprises a main signal electrode portion 21 disposed in the main display section 11, and sub-signal electrode portions 22 and 23 disposed in the sub display section 12. On the other hand, the scanning electrodes 30 are divided into two groups of differently shaped electrodes, one consisting of main scanning electrodes 31 formed in the main display section 11 and the other consisting of sub scanning electrodes 32 formed in the sub display section 12 (though not explicitly shown in FIG. 3, the latter electrodes are comb-shaped as will be described later).

Referring to FIG. 2, the plan shapes of the signal electrodes 20 and the scanning electrodes 30 will be described in further detail. First, the plan shape of the signal electrodes 20 will be described with reference to FIG. 2B. The signal electrodes 20 each comprise the main signal electrode portion 21 disposed in the main display section 11 and the sub-signal electrode portions 22 and 23 disposed in the sub display section 12; the main signal electrode portion 21 is formed in the shape of a long strip extending vertically in the main display section 11. The two sub-signal electrode portions 22 and 23 in the sub display section 12 are identical in shape, each being formed in the shape of a rectangle. The main signal electrode potion 21 is connected to the sub-signal electrode portions 22 and 23 by narrow thin wiring lines (narrow path portions) 24. The narrow path portions 24 are each formed with a width of 10 μm.

The plan shapes of the sub scanning electrodes 32 formed in the sub display section will be described in detail with reference to FIG. 2C. The sub scanning electrodes 32 include an upper sub scanning electrode 33 and a lower sub scanning electrode 34. The upper sub scanning electrode 33 comprises a comb-shaped electrode 33b formed with a plurality of rectangular protrusions protruding like the teeth of a comb downwardly from a wiring electrode portion 33a which extends along the latitudinal direction (the horizontal direction in the figure) of the signal electrodes 20. Likewise, the lower sub scanning electrode 34 comprises a comb-shaped electrode 34b formed with a plurality of rectangular protrusions protruding like the teeth of a comb upwardly from a wiring electrode portion 34a. The comb-shaped electrode portion 33b of the upper sub scanning electrode 33 and the comb-shaped electrode portion 34b of the lower sub scanning electrode 34 are arranged to alternate with each other in interleaving fashion in the horizontal direction.

Next, referring to FIG. 2A, a description will be given of the display pixels 35 formed where the signal electrodes 20 overlap the scanning electrodes 30 in the two-dimensional plane shown in FIG. 3. In FIG. 3, the signal electrodes 20 are indicated by solid lines, and the scanning electrodes 30 by dashed lines. First, the display pixels formed in the main display section 11 will be described. The main signal electrode portion 21 of each signal electrode 20 intersects at right angles with the main scanning electrodes 31, and a square-shaped main display pixel 36 (indicated by hatching) is formed at each of their intersections. The main display pixels 36 are arranged in a matrix pattern in the main display section 11.

Next, display pixels 37 and 38 in the sub display section 12 will be described. As earlier described, each signal electrode 20 includes the pair of sub-signal electrode portions 22 and 23 formed in the sub-display section 12 and connected via the narrow path portions 24 to the main signal electrode portion 21 formed in the main display section 11. The sub-signal electrodes 22 and 23 are arranged to be spaced a prescribed distance apart from each other in the horizontal direction. Of the pair of sub-signal electrodes 22 and 23 provided on each signal electrode 22, the left-hand sub-signal electrode 22 overlaps the comb-shaped electrode portion 33b of the upper sub scanning electrode 33, to form the sub display pixel 37. Likewise, of the pair of sub-signal electrodes 22 and 23 provided on each signal electrode 22, the right-hand sub-signal electrode 23 overlaps the comb-shaped electrode portion 34b of the lower sub scanning electrode 34, to form the sub display pixel 38. Bar code is displayed using these sub display pixels 37 and 38.

The sub display pixels 37 and 38 can be controlled on and off independently of each other, since they are driven by different scanning electrodes in time division fashion; as shown in FIG. 2A, the number of pixels in the horizontal direction in the sub display section 12 is twice the number of pixels in the main display section 11. The main signal electrodes 21 are arranged at a pitch of 0.254 mm (100 dpi) in the main display section 11, while the sub-signal electrodes 22 and 23 are arranged at a pitch of 0.127 mm (200 dpi) in the sub display section 12.

The driving method of the liquid crystal panel 10 according to the present embodiment will be described with reference to FIG. 1. FIG. 1B is a diagram schematically showing, in order to explain the concept of the driving method, the main scanning electrodes 31 arranged in the main display section 11 and the upper scanning electrode 33 and lower scanning electrode 34 arranged in the sub display section 12. It is assumed here that a voltage averaging method is employed and the main scanning electrodes 31 are selected for scanning in sequence from the top of the main display section 11.

After the main scanning electrodes 31 have been selected in sequence, the upper sub scanning electrode 33 is selected. If only a particular one of the plurality of sub display pixels 37 needs to be set ON and the remaining pixels OFF in the sub display section 12; then, during the period that the upper sub scanning electrode 33 is selected, an ON waveform is applied to the main signal electrode 21 connected to the sub-signal electrode 22 forming the sub display pixel 37 to be set ON. If this particular pixel is to be set OFF, an OFF waveform is applied to this signal electrode 21.

Likewise, when the lower sub scanning electrode 34 is selected, if only a particular one of the sub display pixels 38 needs to be set ON and the remaining pixels OFF, then during the period that the lower sub scanning electrode 34 is selected, an ON waveform is applied to the main signal electrode 21 connected to the sub-signal electrode 23 forming the sub display pixel 38 to be set ON. If this particular pixel is to be set OFF, an OFF waveform is applied to this signal electrode 21.

In this way, letters and other desired graphics can be displayed at 100 dpi in the main display section 11, while displaying bar code at 200 dpi in the sub display section 12. Here, the wiring electrode portion 33a of the upper sub scanning electrode 33 is formed as a long, narrow strip so as to cross the narrow path portions 24 of the signal electrodes 20; as a result, unwanted light emission that occurs at the positions where the wiring electrode portion 33a crosses the narrow path portions 24 (the positions where light emission should not occur) is not noticeable because the width of each narrow path portion 24 is small.

Embodiment 2

Figure 4A:
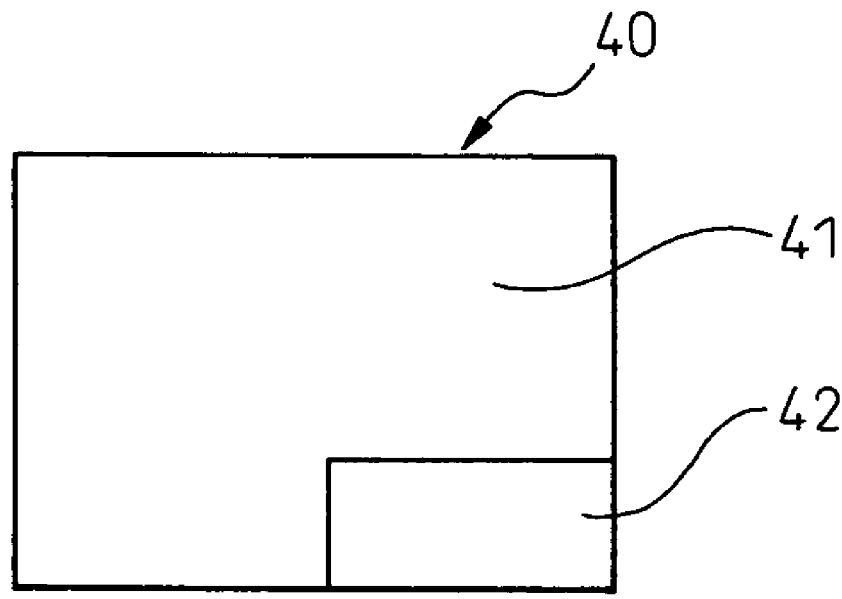
FIG. 4A is a plan view of a liquid crystal panel according to a second embodiment.
Figure 4B:
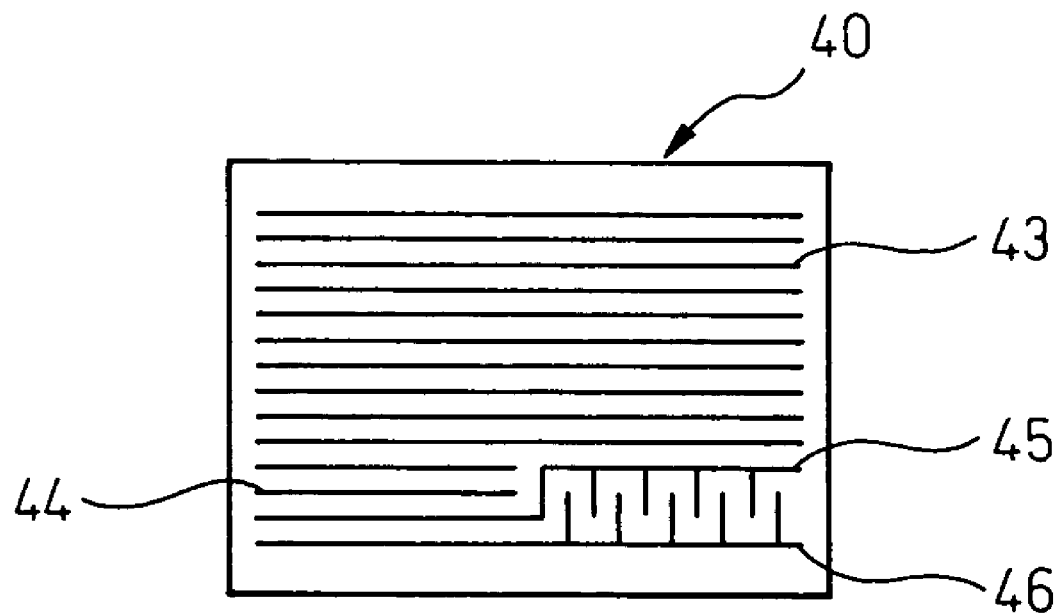
FIG. 4B is a plan view schematically showing an array of scanning electrodes in the liquid crystal panel according to the second embodiment.

The second embodiment will be described with reference to FIG. 4. In the second embodiment, the sub display section 42 is located in one corner of the liquid crystal panel 40. FIG. 4A is a plan view of the liquid crystal panel, and FIG. 4B is a plan view schematically showing an array of scanning electrodes.

The arrangement of the main display section 41 and the sub display section 42 will be described with reference to FIG. 4A. The sub display section 42 is disposed in the lower right corner of the liquid crystal panel 40, and the area other than the sub display section 42 is allocated as the main display section 41. The liquid crystal panel 40 is a passive liquid crystal panel, as in the first embodiment.

The electrode configuration and the driving method will be described with reference to FIG. 4B. The scanning electrodes 41 are divided into two groups, one consisting of main scanning electrodes 43 and 44 formed in the main display section 41 and the other consisting of sub scanning electrodes 45 and 46 formed in both the main display section 41 and the sub display section 42.

The main scanning electrodes 43 are formed extending in the horizontal direction across the entire surface of the liquid crystal panel 40, as in the first embodiment. The main scanning electrodes 44 are disposed to one side of the sub display section 42, the electrodes 44 extending halfway along the width of the liquid crystal panel 40 and stopping so that their wiring lines do not enter the sub display section 42. The pitch of the main scanning lines 43 in the vertical direction is the same as that of the main scanning lines 44. The sub scanning electrodes 45 and 46 each comprise a straight portion formed in the main display section 41 and a comb-shaped portion formed in the sub display section 42.

In the main display section 41 shown in FIG. 4A, the signal electrodes (not shown) are arranged at right angles to the scanning electrodes 43, 44, 45, and 46. Of these signal electrodes, those that do not enter the sub display section 42 comprise only main signal electrodes. On the other hand, the signal electrodes that enter the sub display section 42 are each made up of a main signal electrode in the main display section 41 and two rectangular sub-signal electrodes in the sub display section, as in the first embodiment. Main display pixels in the main display section 41 are formed at the intersections between the main signal electrodes and the scanning electrodes 43 and 44. Sub display pixels in the sub display section are formed at the intersections between the sub-signal electrodes and the scanning electrodes 45 and 46.

Next, the driving method will be described with reference to FIG. 4B. Here also, the voltage averaging method is employed, and the scanning electrodes 43, 44, 45, and 46 are selected in sequence from the top of the main display section 41.

During the period when any one of the main scanning electrodes 43 and 44 in the main display section 41 in FIG. 4A is selected, a driving waveform for displaying a graphic in the main display section 41 is applied to the signal electrodes. When the "scanning electrode 45" is selected, a driving waveform for displaying a graphic in the main display section 41 is applied to those signal electrodes that do not enter the sub display section 42 in FIG. 4A. At the same time, a driving waveform for displaying a graphic, for example, bar code, in the sub display section 42 is applied to those signal electrodes that enter the sub display section 42. Likewise, when the scanning electrode 46 is finally selected, a driving waveform for displaying a graphic in the main display section 41 is applied to those signal electrodes that do not enter the sub display section 42 in FIG. 4A. At the same time, a driving waveform for displaying a graphic, for example, bar code, in the sub display section 42 is applied to those signal electrodes that enter the sub display section 42. The waveform applied to each signal electrode here is either an ON waveform or an OFF waveform.

In the second embodiment, the main display section 41 is enlarged by forming the scanning electrodes 45 and 46 so as to be shared between the main display section 41 and the sub display section 42, as shown in FIG. 4B. As in the first embodiment, the main signal electrodes are arranged at 100 dpi as viewed in the direction of arrangement of the signal electrodes, while the sub-signal electrodes are arranged at 200 dpi as viewed in the direction of arrangement of the signal electrodes. This means that the pixel pitch in the sub display section 42 is one half of the pixel pitch in the main display section. Further, as in the first embodiment, each main signal electrode and its corresponding sub-signal electrodes are connected by thin wiring lines.

Embodiment 3

Figure 5A:
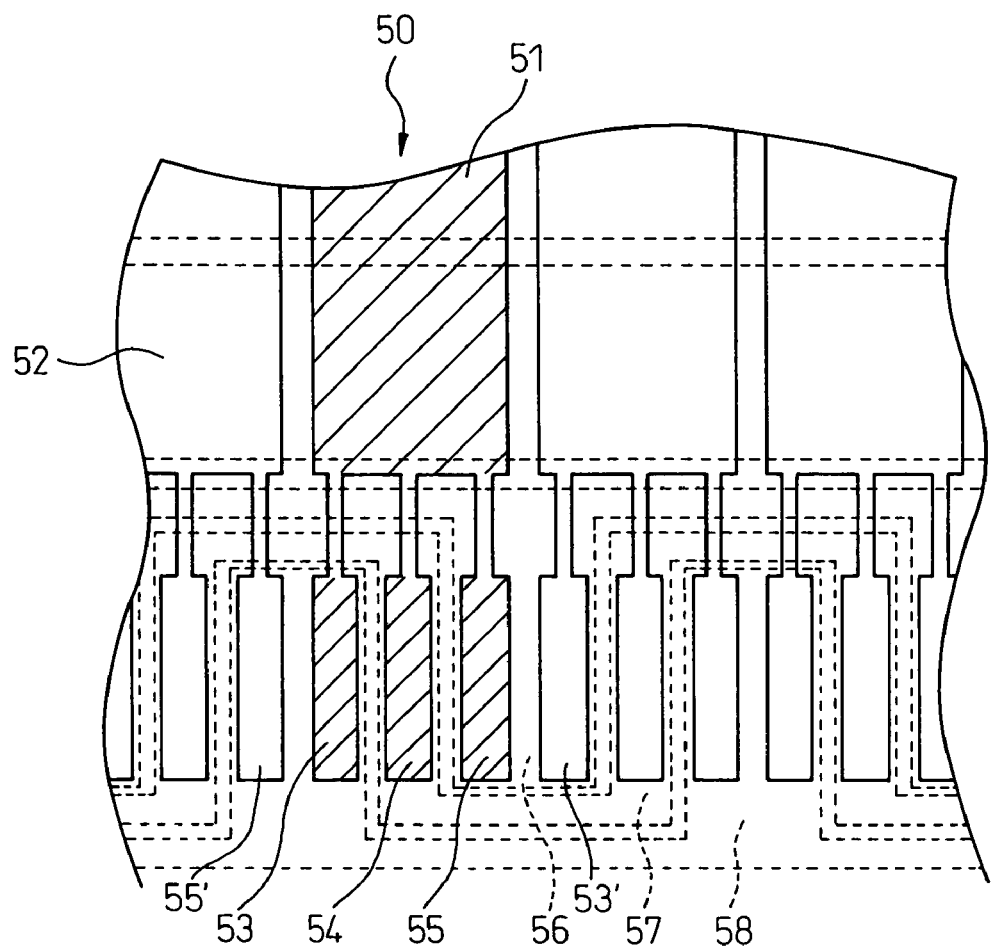
FIG. 5A is an enlarged plan view of an essential portion of some electrodes, showing the spatial relationship between signal electrodes and scanning electrodes according to the third embodiment.
Figure 5B:
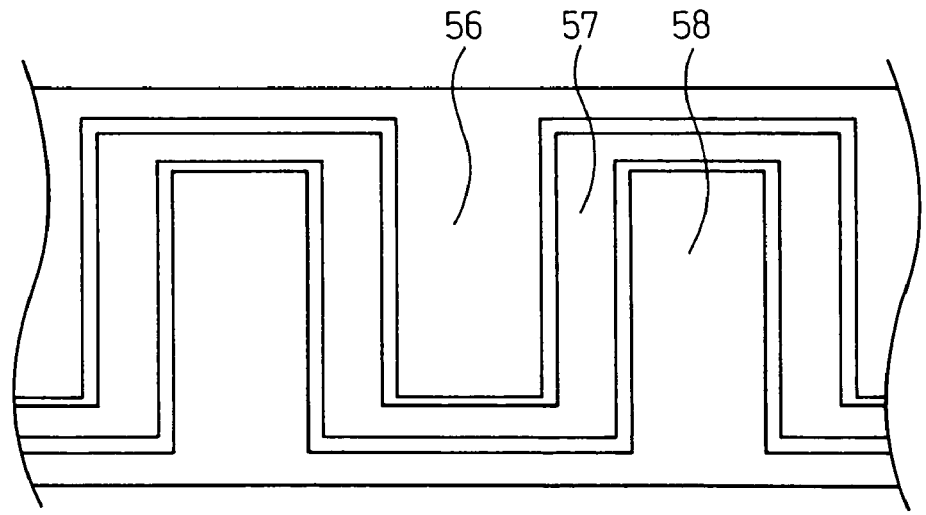
FIG. 5B is an enlarged plan view of an essential portion of some electrodes, showing the scanning electrodes in the sub display section according to the third embodiment.

The third embodiment will be described with reference to FIG. 5. FIG. 5A shows how the signal electrodes overlap the scanning electrodes in a two-dimensional plane, and FIG. 5B shows the sub scanning electrodes in the sub display section. In FIG. 5A, the signal electrode configuration differs from the first and second embodiments in that each signal electrode comprises one main signal electrode 51 and three sub-signal electrode portions 53, 54, and 55 connected to it by thin wiring lines (narrow path portions: line width is about 10 μm); otherwise, the configuration is the same. Here, the sub-signal electrode portion 53 indicates the leftmost one of the three horizontally arranged sub-signal electrodes of the signal electrode 50. Likewise, 54 indicates the middle one, and 55 indicates the signal electrode portion located at the rightmost end.

In FIG. 5B, the upper sub scanning electrode 56 is formed in the shape of a comb whose teeth are pointed downward, and the pitch of the teeth in the horizontal direction is twice as large as that of the main signal electrodes 51. The middle sub scanning electrode 57 is formed in the shape of a periodically repeating rectangle; the period of the rectangle is also twice as large as the pitch of the main signal electrodes 51. The lower sub scanning electrode 58 is formed in the shape of a comb whose teeth are pointed upward, and the pitch of the teeth is twice as large as that of the main signal electrodes 51. The sub scanning electrodes 56, 57, and 58 are formed in an interleaving fashion, and electrically insulated from each other.

Turning back to FIG. 5A, the pixel arrangement will be described. In the figure, the signal electrodes are indicated by solid lines, and the scanning electrodes by dashed lines. The main signal electrodes 51 in the main display section are arranged at a pitch of 0.381 mm (67 dpi) in the horizontal direction in the figure. Since the main scanning electrodes 52 are also arranged at the same pitch in the vertical direction in the figure, the main display section is a dot matrix with a pixel pitch of 0.381 mm. In the sub display section, the portions where the sub-signal electrodes 53, 54, and 55 overlap the sub scanning electrodes 56, 57, and 58 form the sub display pixels for displaying bar code or the like. The upper sub scanning electrode 56 overlaps only with adjacent sub-signal electrodes 55 and 53 (for example, 53') between two adjacent signal electrodes 50; in this case, the upper sub scanning electrode 56 overlaps the two sub-signal electrodes, the sub-signal electrode 55 on the left and the sub-signal electrode 53 (for example, 53') on the right. On the other hand, the middle sub-signal electrode 57 overlaps only the middle sub-signal electrode 54 of each signal electrode 50. The lower sub scanning electrode 58 overlaps only adjacent sub-signal electrodes 53 and 55 (for example, 55') between two adjacent signal electrodes 50; in this case, the lower sub scanning electrode 58 overlaps the two sub-signal electrodes, the sub-signal electrode 55 (for example, 55') on the left and the sub-signal electrode 53 on the right. The pitch of the thus formed sub display pixels is 0.127 mm (200 dpi), which is one-third of the pixel pitch in the main display section.

The driving method is substantially the same as that employed in the first and second embodiments. After the main scanning electrodes 52 in the main display section have been selected in sequence, the sub scanning electrodes 56, 57, and 58 in the sub display section are selected in sequence for scanning. When the upper sub scanning electrode 56 is selected, driving waveforms corresponding to the display data, such as a bar code, to be displayed by the sub display pixels formed by the overlapping of the upper sub scanning electrode 56 and the sub-signal electrode portions 55 and 53 (for example, 53') are applied to the signal electrode 50 having the sub-signal electrode 55 and the signal electrode 50 having the sub-signal electrode 53 (for example, 53'), respectively. Next, when the middle sub scanning electrode 57 is selected, driving waveforms corresponding to the display data, such as a bar code, to be displayed by the sub display pixels formed by the overlapping with the respective sub-signal electrodes 54, are applied to the signal electrodes 50 having the respective sub-signal electrodes 54. Finally, when the lower sub scanning electrode 58 is selected, driving waveforms corresponding to the display data, such as a bar code, to be displayed by the sub display pixels formed by the overlapping of the lower sub scanning electrode 58 and the sub-signal electrodes 53 and 55 (for example, 55') are applied to the signal electrode 50 having the sub-signal electrode 53 and the signal electrode 50 having the sub-signal electrode 55 (for example, 55'), respectively.

Embodiment 4

Figure 6A:
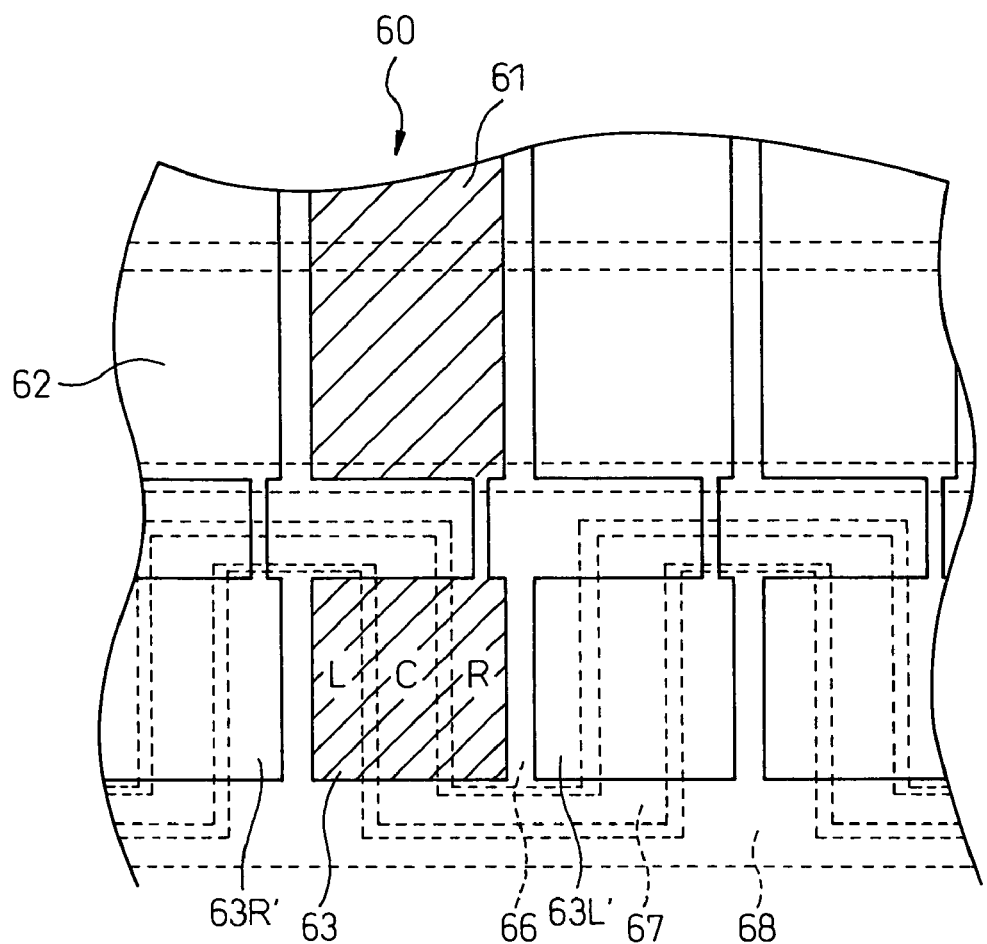
FIG. 6A is an enlarged plan view of an essential portion of some electrodes, showing the spatial relationship between signal electrodes and scanning electrodes according to a fourth embodiment.
Figure 6B:
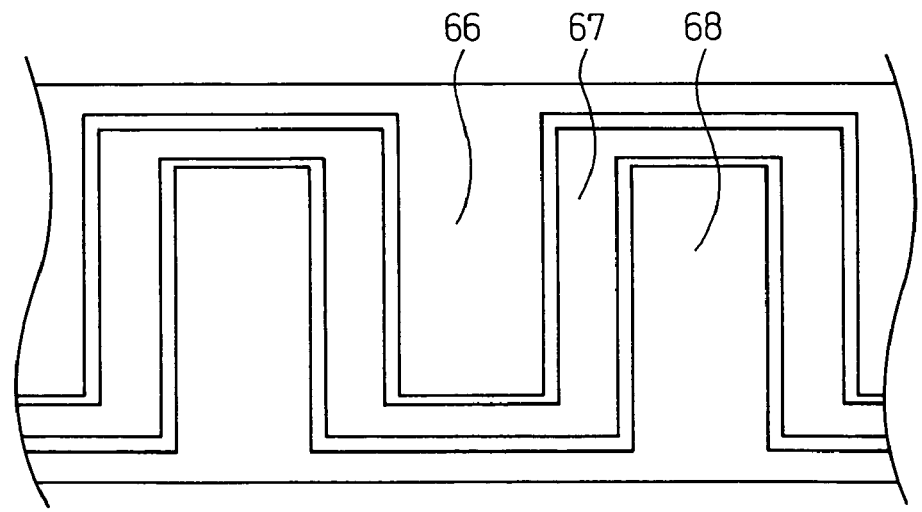
FIG. 6B is an enlarged plan view of an essential portion of some electrodes, showing the scanning electrodes in the sub display section according to the fourth embodiment.

FIG. 6 presents enlarged plan views showing essential portions of electrodes according to the fourth embodiment: FIG. 6A is a diagram showing the spatial relationship between signal electrodes and scanning electrodes according to the fourth embodiment, FIG. 6B is a diagram showing the scanning electrodes in the sub display section, FIG. 6C is a diagram showing a modified example of a signal electrode in which the signal electrode comprises a main display portion, a first sub display portion, and a second sub display portion, and FIG. 6D is a diagram showing another modified example of a signal electrode in which the second sub display portion shown in FIG. 6C is disposed at the head of the main display portion.

The fourth embodiment will be described with reference to FIG. 6. FIG. 6A shows how the signal electrodes overlap the scanning electrodes in a two-dimensional plane, and FIG. 6B shows the sub scanning electrodes in the sub display section. In FIG. 6A, the signal electrode configuration differs from the first, second, and third embodiments in that each signal electrode comprises one main signal electrode 61 and one sub-signal electrode portion 63 connected to it by a thin wiring line (narrow path portion: line width is about 10 μm); otherwise, the configuration is the same.

The only difference between the third and fourth embodiments is whether or not the signal electrode portion (area) for forming the sub display pixels is divided into separate portions one for each individual sub display pixel; therefore, the sub scanning electrode shape and the driving method are the same between the third and fourth embodiments.

In FIG. 6B, the upper sub scanning electrode 66 is formed in the shape of a comb whose teeth are pointed downward, and the pitch of the teeth in the horizontal direction is twice as large as that of the main signal electrodes 61. The middle sub scanning electrode 67 is formed in the shape of a periodically repeating rectangle; the period of the rectangle is also twice as large as the pitch of the main signal electrodes 61. The lower sub scanning electrode 68 is formed in the shape of a comb whose teeth are pointed upward, and the pitch of the teeth is twice as large as that of the main signal electrodes 61. The sub scanning electrodes 66, 67, and 68 are formed in an interleaving fashion, and are electrically insulated from each other.

Turning back to FIG. 6A, the pixel arrangement will be described. In the figure, the signal electrodes are indicated by solid lines, and the scanning electrodes by dashed lines. The main signal electrodes 61 in the main display section are arranged at a pitch of 0.381 mm (67 dpi) in the horizontal direction in the figure. As the main scanning electrodes 62 are also arranged at the same pitch in the vertical direction in the figure, the main display section is a dot matrix with a pixel pitch of 0.381 mm. In the sub display section, the portions where the sub-signal electrode portions 63R, 63C, and 63L overlap the sub scanning electrodes 66, 67, and 68 form the sub display pixels for displaying bar code or the like (here, 63R indicates the one-third portion in the right of the electrode 63, 63C the one-third portion in the center of the electrode 63, and the 63L the one-third portion in the left of the electrode 63). The upper sub scanning electrode 66 overlaps only the adjacent sub-signal electrode portions 63R and 63L (for example, 63L') between two adjacent signal electrodes 60; in this case, the upper sub scanning electrode 66 overlaps the two sub-signal electrode portions, the sub-signal electrode portion 63R on the left and the sub-signal electrode 63L on the right. On the other hand, the middle sub-signal electrode 67 overlaps only the middle sub-signal electrode portion 63C of each signal electrode 60. The lower sub scanning electrode 68 overlaps the adjacent sub-signal electrode portions 63L and 63R (for example, 63R') between two adjacent signal electrodes 60; in this case, the lower sub scanning electrode 68 overlaps the two sub-signal electrode portions, the sub-signal electrode portion 63R on the left and the sub-signal electrode portion 63L on the right. The pitch of the thus formed sub display pixels is 0.127 mm (200 dpi), which is one-third of the pixel pitch in the main display section.

The driving method is substantially the same as that employed in the first and second embodiments. After the main scanning electrodes 62 in the main display section have been selected in sequence, the sub scanning electrodes 66, 67, and 68 in the sub display section are selected in sequence for scanning. When the upper sub scanning electrode 66 is selected, driving waveforms corresponding to the display data, such as bar code, to be displayed by the sub display pixels formed by the overlapping of the upper sub scanning electrode 66 and the sub-signal electrode portions 63R and 63L (for example, 63L') are applied to the signal electrode 60 having the sub-signal electrode portion 63R and the signal electrode 60 having the sub-signal electrode portion 63L (for example, 63L'), respectively. Next, when the middle sub scanning electrode 67 is selected, driving waveforms corresponding to the display data, such as bar code, to be displayed by the sub display pixels formed by overlapping the respective sub-signal electrode portions 63C, are applied to the signal electrodes 60 having the respective sub-signal electrode portions 63C. Finally, when the lower sub scanning electrode 68 is selected, driving waveforms corresponding to the display data, such as bar code, to be displayed by the sub display pixels formed by overlapping the lower sub scanning electrode 68 and the sub-signal electrode portions 63L and 63R (for example, 63R') are applied to the signal electrode 60 having the sub-signal electrode portion 63L and the signal electrode 60 having the sub-signal electrode portion 63R (for example, 63R'), respectively.

Here, examples will be shown in which the plurality of display pixels formed on each of the plurality of signal electrodes are divided into three kinds: the main display pixel, the first sub-display pixel, and the second sub-display pixel. FIG. 6C is a diagram showing a modified example of the signal electrode in which the signal electrode 60A comprises a main display portion 62A, a first sub-display portion 63A for displaying, for example, bar code, and a second sub-display portion 64A for displaying, for example, an icon. FIG. 6D is a diagram showing another modified example of the signal electrode in which the second sub-display portion 64A shown in FIG. 6C is disposed at the head of the main display portion 62A, that is, the signal electrode 60B comprises a main display portion 62B, a first sub display portion 63B, and a second sub display portion 64B. In these modified examples, the signal electrode wiring line extends upward in the figure for connection to a signal electrode driving circuit.

Embodiment 5

Figure 7A:
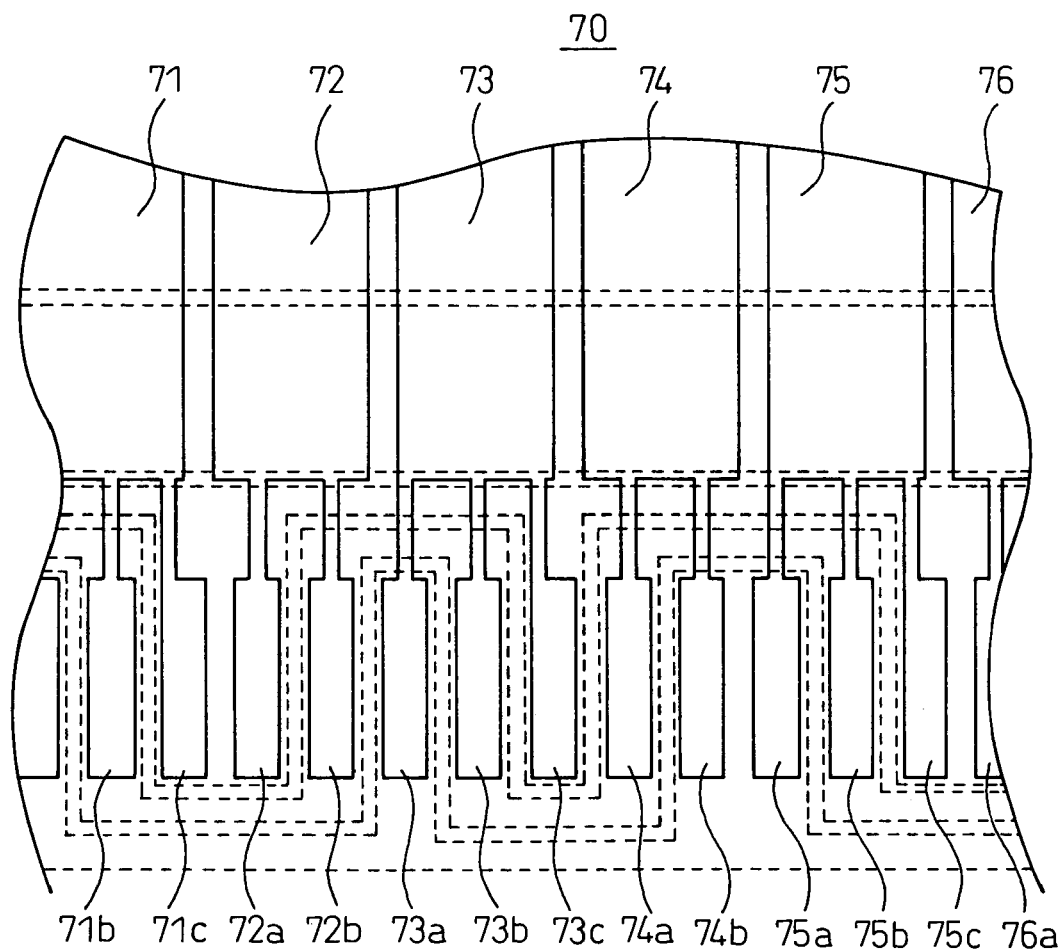
FIG. 7A is an enlarged plan view of an essential portion of some electrodes, showing the spatial relationship between signal electrodes and scanning electrodes according to a fifth embodiment.
Figure 7B:
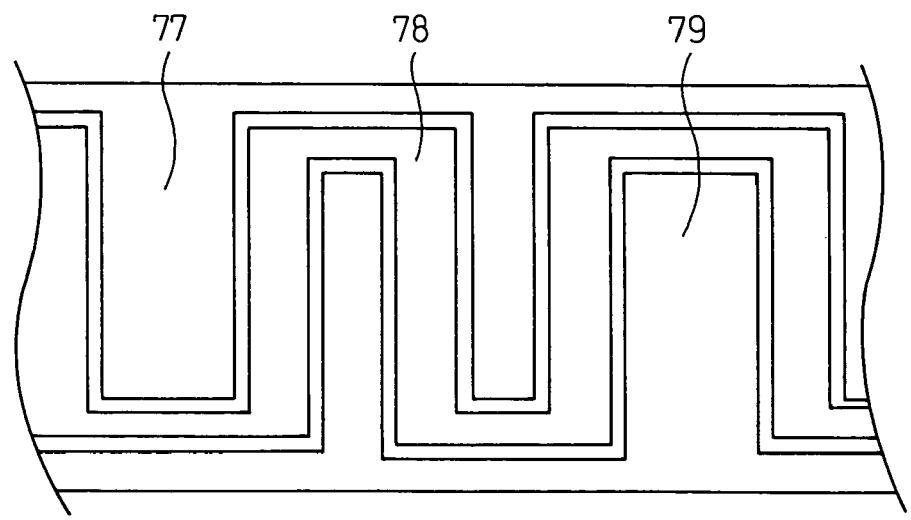
FIG. 7B is an enlarged plan view of an essential portion of some electrodes, showing the scanning electrodes in the sub display section according to the fifth embodiment.

The fifth embodiment will be described with reference to FIG. 7. As shown in FIG. 7A, the fifth embodiment differs from the third embodiment in that the signal electrodes 70 alternate between electrodes (71, 73, 75), each having three sub-signal electrode portions, and electrodes (72, 74, 76), each having two sub-signal electrode portions; otherwise, the configuration is the same as that of the third embodiment. As shown in FIG. 7B, there are three sub-scanning electrodes: the upper scanning electrode 77, the middle sub scanning electrode 78, and the lower scanning electrode 78. The upper scanning electrode 77 has two kinds of comb-shaped portions differing in width, one being a wide portion which overlaps both the sub-signal electrodes 71c and 72a or both the sub-signal electrodes 75c and 76a, and the other being a narrow portion which overlaps the sub-signal electrode 73c. The middle sub-scanning electrode 78 has comb-shaped portions equal in width, the width being just sufficient to cover each of the sub-signal electrode portions 71b, 72b, 73b, 74a, 75b. The lower sub scanning electrode 79 comprises two kinds of portions, one being a wide portion which overlaps both the sub-signal electrode portions 74b and 75a and the other being a narrow portion which overlaps the sub-signal electrode 73a. This overlapping arrangement of the sub-signal electrode portions and the sub scanning electrodes repeats every 10 sub-signal electrodes, that is, the same arrangement pattern appears after every 10th sub-signal electrode.

In this embodiment, there are five signal electrodes 72 for any two adjacent sub-signal electrodes 70. In this way, the pixel pitch in the sub display section can be reduced by a factor of 2.5, compared with the pixel pitch in the main display section.

For the passive liquid crystal panel, not only a nematic type liquid crystal but also a liquid crystal having a memory property, such as a cholesteric type liquid crystal, can be used. With the memory property, since there is no need to perform periodic vertical scanning, the power consumption can be reduced.

Embodiment 6

Figure 8:
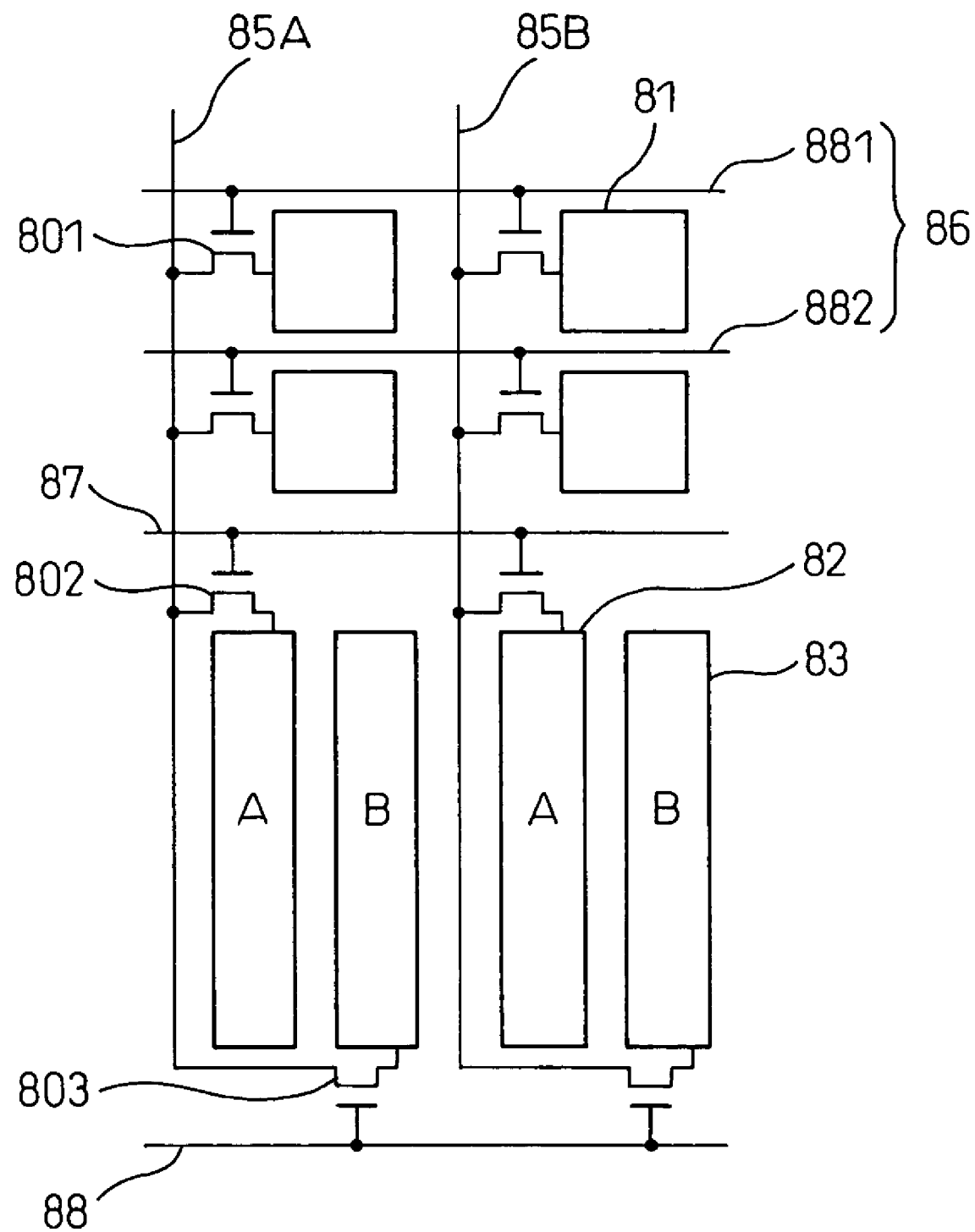
FIG. 8 is a plan view showing an essential portion of a liquid crystal panel according to a sixth embodiment.

The sixth embodiment will be described with reference to FIG. 8. The sixth embodiment concerns an example in which the present invention is applied to an active liquid crystal panel which contains switching devices formed from thin-film transistors (hereinafter referred to as the TFTs) within the liquid crystal panel. FIG. 8 is a circuit diagram schematically showing the interconnections between the TFT devices and pixels in the liquid crystal panel.

A plurality of square-shaped main pixel electrodes 81 form the main display section, and a plurality of rectangle-shaped sub pixel electrodes 82, 83 form the sub display section. Signal lines 85A, 85B and scanning lines 86 intersect at right angles with each other. A TFT device 801 and a main pixel electrode 81 forming part of the main display section are located at each intersection between the signal lines 85A, 85B and the scanning lines 86. The signal line 85 is connected to the source of the TFT device 801, and the scanning line 86 is connected to the gate of the TFT device 801. The drain of the TFT device 801 is connected to the main pixel electrode 81 in the main display section.

In the sub display section, a TFT device 802 and a rectangle-shaped sub pixel electrode 82 for bar code display are located where the signal line 85A, 85B intersects with a scanning line 87. The signal line 85A, 85B is connected to the source of the TFT device 802, and the scanning line 87 is connected to the gate of the TFT device 802. The drain of the TFT device 802 is connected to the bar code display sub pixel electrode 82. Further, the signal line 85 is connected to the source of a TFT device 803, whose gate is connected to a scanning line 88. The drain of the TFT device 803 is connected to a bar code display sub pixel electrode 83. The bar code display sub pixel electrodes 82 and 83 are identical in shape and are arranged alternately.

The pitch of the sub display electrodes 83 in the horizontal direction in the figure is one half of the pitch of the main display electrodes 81 in the horizontal direction. One common electrode (not shown) is formed on the surface of a substrate that faces the substrate surface on which the main pixel electrodes 81 in the main display section and the sub pixel electrodes 82, 83 in the sub display section are formed. The main pixel electrodes 81 in the main display section and the sub pixel electrodes 82, 83 in the sub display section are separated from the common electrode by a liquid crystal sandwiched therebetween.

The driving method of the sixth embodiment will be described below with reference to FIG. 8. In the main display section, a selection pulse is applied to the scanning lines 86 (881, 882) in sequence from the top. When the selection pulse is applied, conduction occurs in the TFT device 801 connected to the scanning line 86 to which the selection pulse is applied, and a voltage corresponding to the graphic to be displayed in the main display section is applied to the main pixel electrode 81 via the signal line 85A, 85B (hereinafter referred to as the writing). When the selection pulse is applied to another scanning line 86, the TFT device 801 becomes non-conducting, and the main pixel electrode 81 in the main display section retains the applied voltage. When the selection pulse has been applied to all the scanning lines 86, and the writing to all the main pixel electrodes 81 in the main display section is completed, the selection pulse is applied to the scanning lines 87 and 88 in sequence, and a voltage corresponding to bar code data is written to the bar code display sub pixel electrodes 82 and 83 in the same manner as described above.

As a desired driving voltage can be applied to each individual pixel in the active liquid crystal panel, the liquid crystal panel can make use of a polymer dispersed liquid crystal (for example, a polymer network liquid crystal) which has two states, opaque and transparent, and which does not need the provision of polarizers. The present invention is not limited to liquid crystal panels, but is applicable to any display apparatuses whose optical properties are controlled by electrical means using voltage or current. For example, the invention is equally applicable to display apparatuses that use electrophoretic materials or organic light-emitting devices rather than liquid crystal materials.

Embodiment 7

Figure 9:
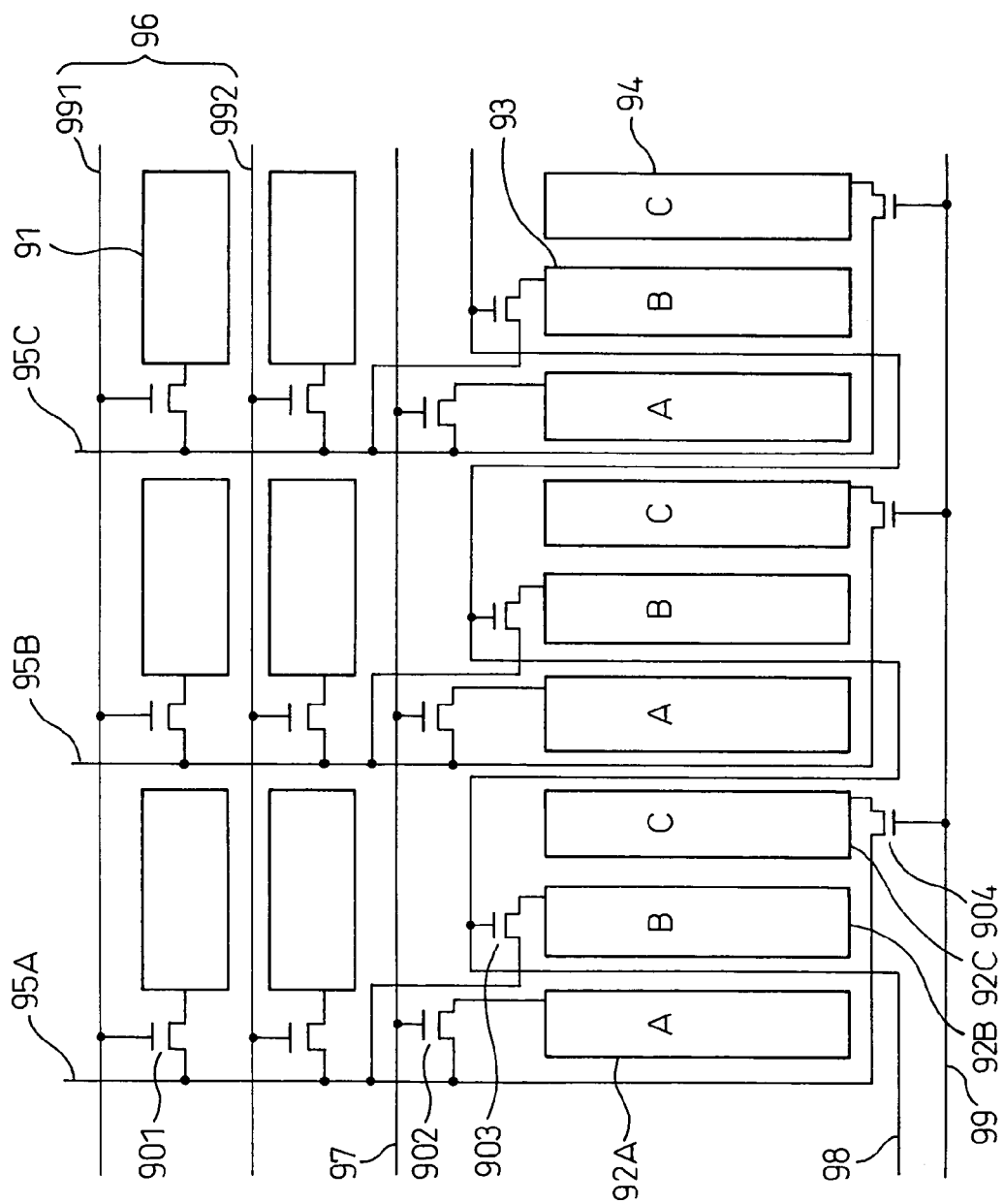
FIG. 9 is a plan view showing an essential portion of a liquid crystal panel according to a seventh embodiment.

FIG. 9 is a plan view showing an essential portion of a liquid crystal panel according to the seventh embodiment. The seventh embodiment will be described with reference to FIG. 9. The seventh embodiment concerns an example in which the present invention is applied to an active liquid crystal panel which contains switching devices formed from thin-film transistors (hereinafter referred to as the TFTs) within the liquid crystal panel. FIG. 9 is a circuit diagram schematically showing the interconnections between the TFT devices and pixels in the liquid crystal panel.

A plurality of square-shaped main pixel electrodes 91 form the main display section, and a plurality of rectangle-shaped sub pixel electrodes 92, 93, 94 form the sub display section. Signal lines 95A, 95B, 95C and scanning lines 96 intersect at right angles with each other. A TFT device 901 and a main pixel electrode 91 forming part of the main display section are located at each intersection between the signal lines 95A, 95B, 95C and the scanning lines 96. The signal line 95A, 95B, 95C is connected to the source of the TFT device 901, and the scanning line 96 is connected to the gate of the TFT device 901. The drain of the TFT device 901 is connected to the main pixel electrode 91 in the main display section.

In the sub display section, TFT devices 902, 903, and 904 and rectangle-shaped sub pixel electrodes 92A, 92B, and 92C for bar code display are respectively located where the signal line 95A, 95B, 95C intersects with scanning line 97, 98, and 99. The signal line 95A, 95B, 95C is connected to the sources of the TFT devices 902, 903, and 904, and the scanning lines 97, 98, and 99 are connected to the gates of the TFT device 902, 903, and 904, respectively. The drains of the TFT device 902, 903, and 904 are connected to the bar code display sub pixel electrodes 92A, 92B, and 92C, respectively. The bar code display sub pixel electrodes 92, 93, and 94 are identical in shape and are arranged in this order in a repetitive manner. In the figure, the scanning line 98 being formed in a rectangular shape indicates that the scanning line 98 does not intersect with the other scanning lines 97 and 99. That is, as the scanning lines 97, 98, and 99 are formed on the same layer, they must be formed so as not to intersect with each other, and this can be accomplished by forming the scanning line 98 in a rectangular shape. Likewise, the wiring line between the source of the TFT 903 and the signal line 95A is routed so as to circumvent the TFT 902 in order to avoid an electrical short between the source and drain formed on the same layer.

The pitch of the sub display electrodes 92, 93, 94 in the horizontal direction in the figure is one thirds of the pitch of the main display electrodes 91 in the horizontal direction. One common electrode (not shown) is formed on the surface of a substrate that faces the substrate surface on which the main pixel electrodes 91 in the main display section and the sub pixel electrodes 92, 93, 94 in the sub display section are formed. The main pixel electrodes 91 in the main display section and the sub pixel electrodes 92, 93, 94 in the sub display section are separated from the common electrode by a liquid crystal sandwiched therebetween.

The driving method of the seventh embodiment will be described below with reference to FIG. 9. In the main display section, a selection pulse is applied to the scanning lines 96 (991, 992) in sequence from the top. When the selection pulse is applied, conduction occurs in the TFT device 901 connected to the scanning line 96 to which the selection pulse is applied, and a voltage corresponding to the graphic to be displayed in the main display section is applied to the main pixel electrode 91 via the signal line 95A, 95B, 95C (hereinafter referred to as writing). When the selection pulse is applied to another scanning line 96, the TFT device 901 becomes non-conducting, and the main pixel electrode 91 in the main display section retains the applied voltage. When the selection pulse has been applied to all the scanning lines 96, and writing to all the main pixel electrodes 91 in the main display section is completed, the selection pulse is applied to the scanning lines 97, 98, and 99 in sequence, and a voltage corresponding to bar code data is written to the bar code display sub pixel electrodes 92, 93, and 94 in the same manner as described above.

Embodiment 8

Figure 10A:
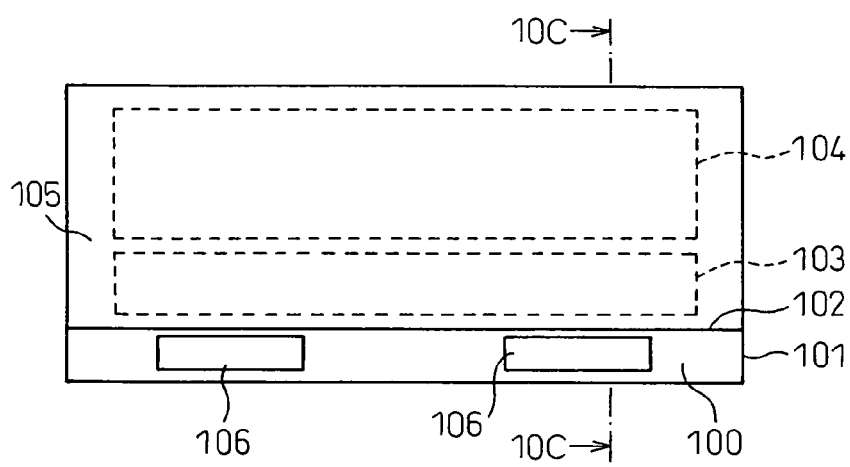
FIG. 10A is a plan view of a liquid crystal panel according to an eighth embodiment.
Figure 10C:
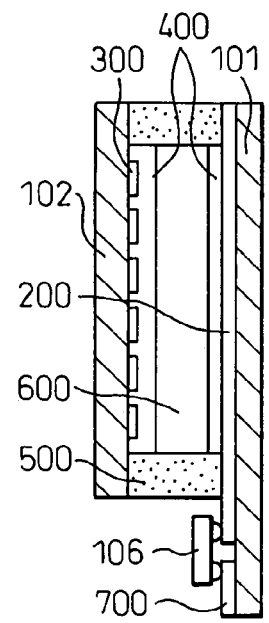
FIG. 10C is a cross-sectional view of the liquid crystal panel taken along line 10C-10C in FIG. 10A.
Figure 10B:
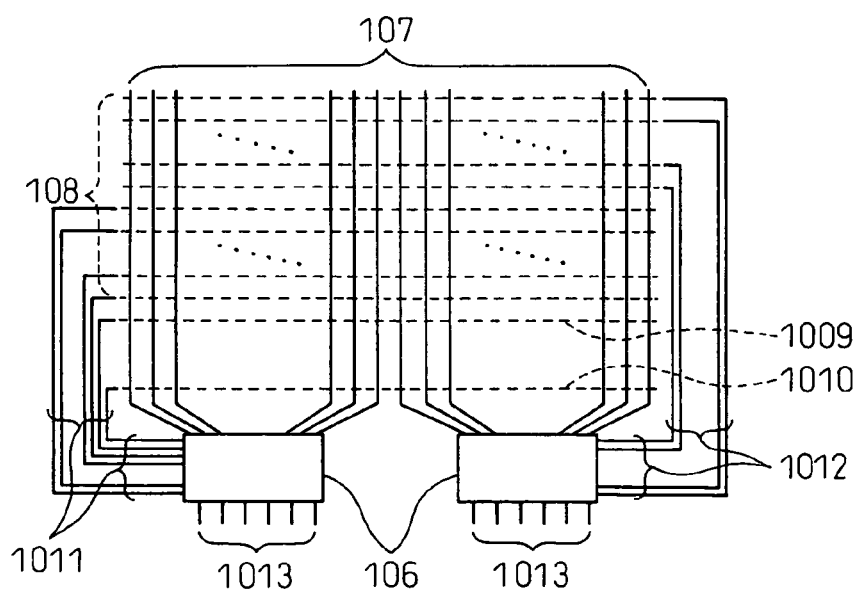
FIG. 10B is a connection diagram for the liquid crystal panel according to the eighth embodiment.
Figure 11A:
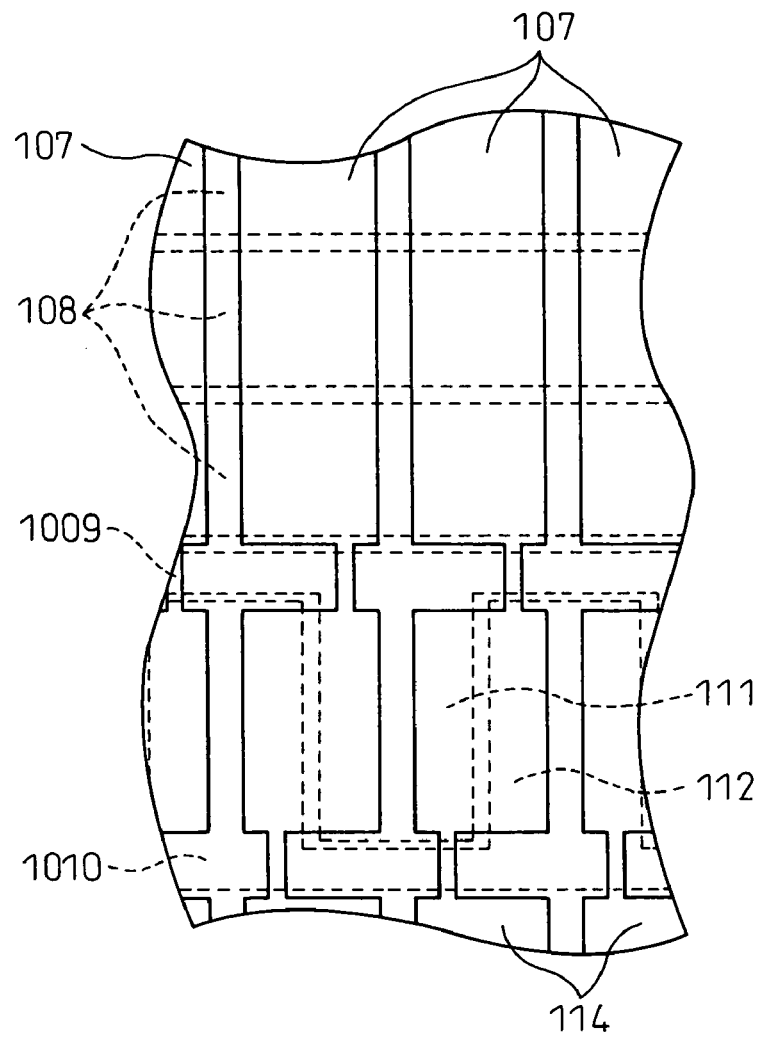
FIG. 11A is an enlarged plan view of an essential portion of some electrodes, showing the spatial relationship between signal electrodes and scanning electrodes according to the eighth embodiment.
Figure 11B:
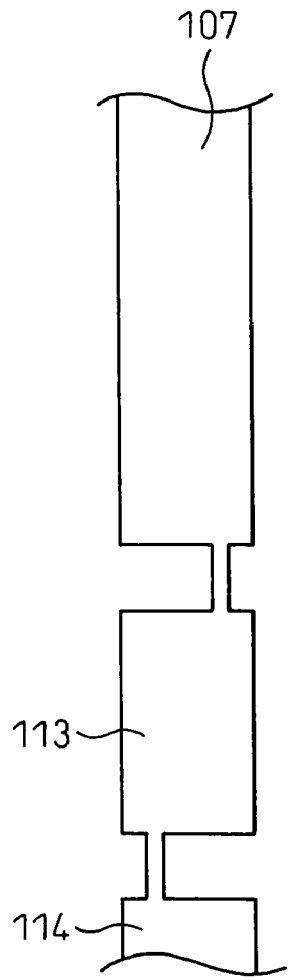
FIG. 11B is a diagram showing a signal electrode taken from FIG. 11A.
Figure 11C:
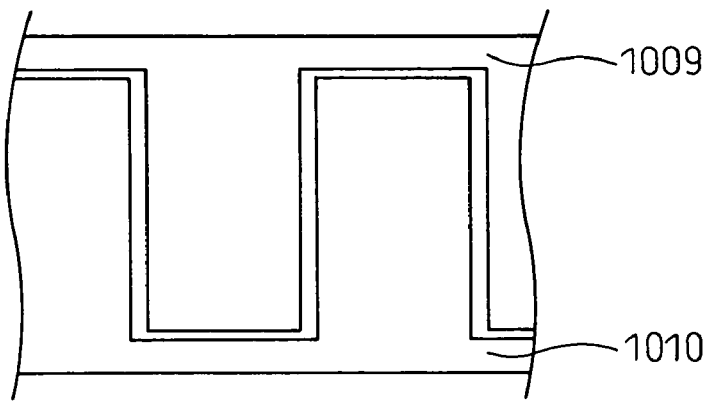
FIG. 11C is an enlarged plan view of an essential portion of some electrodes, showing the scanning electrodes in the sub display section according to the eighth embodiment.

FIGS. 10 and 11 are diagrams showing the eighth embodiment of the present invention. FIG. 10A is a plan view of a liquid crystal panel, FIG. 10B is a connection diagram for explaining the connections of integrated circuits and electrodes, and FIG. 10C is a cross-sectional view of the liquid crystal panel taken along line 10C-10C in FIG. 10A. FIG. 11A is a diagram showing the positional relationship between signal electrodes and scanning electrodes in a two-dimensional plane, FIG. 11B is a diagram showing the plan shape of a signal electrode taken from FIG. 11A, and FIG. 11C shows the plan shape of a portion of the scanning electrodes in the sub display section. In FIG. 11, the sub display section is shown by reducing its size, top to bottom, for illustrative purposes.

An external view of the liquid crystal panel will be described with reference to FIG. 10A. A bottom glass substrate 101 (hereinafter referred to as the bottom glass) and a top glass substrate 102 (hereinafter referred to as the top glass) are overlaid one on top of the other by aligning the upper sides and the right and left sides between them. The bottom glass 101 is larger than the top glass 102, and thus has an area 100 extending beyond the lower side. Two integrated circuits 106 for display are mounted on this area 100. Inside an area 105 where the bottom glass 101 and the top glass 102 overlap, there are formed a main display section 104 (indicated by dashed lines) in the upper part and a sub display section 103 (indicated by dashed lines) in the lower part as viewed in the plane of FIG. 10A. The main point of the plan structure of the present embodiment is that the integrated circuits 106 for display are mounted in close proximity to the sub display section 103.

The arrangement of the wiring lines and the electrodes and the connections between the integrated circuits 106 and the electrodes will be described by referring to FIG. 10A in conjunction with FIG. 10B. The liquid crystal panel shown is a passive driving liquid crystal panel. Main scanning electrodes 108, an upper sub scanning electrode 1009, and a lower sub scanning electrode 1010 are formed (as indicated by dashed lines) on the back surface of the top glass 102 serving as the top substrate, while a plurality of signal electrodes 107, a plurality of interconnecting wiring lines 1011, 1012, and a plurality of input/output electrodes are formed on the upper surface of the bottom glass 101 serving as the bottom substrate. The interconnecting wiring lines 1011 and 1012 on the left and right sides are brought out from the left and right sides of the left- and right-hand integrated circuits 106, respectively, and are routed along the peripheral areas of the bottom glass 101 into the areas of the bottom glass 101 that are adjacent to the left and right sides of the main display section 104 and sub-display section 103. Here, the interconnecting wiring lines 1011 and 1012 are connected by means of anisotropic conductive particles (not shown) to the main scanning electrodes 108 and the upper and lower sub scanning electrodes 1009 and 1010 formed on the top glass 102. Of the interconnection wiring lines 1011 on the left side, the uppermost wiring line is connected to the lower sub-scanning electrode 1010, the second uppermost wiring line is connected to the upper sub-scanning electrode 1009 on the top glass 102, and the remaining wiring lines are connected to the main scanning electrodes 108 formed on the area of the top glass 102 that substantially corresponds to the lower half of the main display section 104. The interconnection wiring lines 1012 on the right side are connected to the main scanning electrodes 108 formed on the area of the top glass 102 that substantially corresponds to the upper half of the main display section 104. The comb-shaped electrode portions of the upper and lower sub scanning electrodes 1009 and 1010 are not shown in FIG. 10. Further, in the figure, oblique dotted lines indicate that the main scanning electrodes 108 and the signal lines 107 are formed in a repetitive manner.

The integrated circuits 106 each contain a scanning electrode driving circuit, a signal electrode driving circuit, a liquid crystal panel driving power supply circuit, an interface circuit, and their control circuits integrated on a single chip; in the embodiment of the present invention, NJU6821 manufactured by New Japan Radio Co., Ltd. is used. This integrated circuit 106 has a plurality of input terminals, a plurality of scanning electrode driving terminals, and a plurality of signal electrode driving terminals. These terminals are connected to the connecting portions of the signal electrodes 107, the interconnecting wiring lines 1011 and 1012, and the input/output electrodes 1013 via an anisotropic conductive film (ACF, not shown) formed by mixing conductive particles (and insulating particles in some cases) into an insulating adhesive material. NJU6821 used as the integrated circuit here has 80 scanning electrode driving terminals; 40 terminals are arranged on each of the two shorter sides of the rectangular chip. In the present embodiment, of the scanning electrode driving terminals on the left-hand integrated circuit 106, terminals 0 to 39 (designated COM0 to COM39 in the device specification) are used and, of the scanning electrode driving terminals on the right-hand integrated circuit 106, terminals 40 to 79 (designated COM40 to COM79) are used. Further, one of the integrated circuits 106 is used in the master mode in which the power supply and other control functions are enabled, and the other integrated circuit 106 is used in the slave mode in which these control functions are disabled. The main display section 104 comprises a dot matrix having 78 lines and a resolution of 100 dpi, while the sub display section 103 has a resolution of 200 dpi.

As shown in FIG. 10C, the liquid crystal panel 150 according to the eighth embodiment of the present invention comprises the first glass substrate 101 and the second glass substrate 102, and the plurality of signal electrodes 200 extending in the vertical direction (as viewed in the plane of FIG. 10C) are formed in orderly fashion on one surface of the first glass substrate 101, while the scanning electrodes 300 are formed on one surface of the second glass substrate 102; these electrode arrays are each covered with an alignment film 400. The first and second glass substrates with the plurality of signal electrodes 200 and the plurality of scanning electrodes 300 formed on their opposing surfaces are sealed with a seal material 500 by providing a gap therebetween, and an electro-optical conversion material, for example, a liquid crystal 600, is filled into the gap; in this structure, a display image is produced by varying the optical characteristics of the electro-optical conversion material by applying a prescribed voltage to each of the plurality of display pixels formed at positions where the signal electrodes 200 overlap the scanning electrodes 300. The integrated circuits 106 are mounted between the signal electrodes 200 and external terminals 700, and signal lines in the integrated circuits are connected between them.

The plan shapes of the signal electrodes 107 and the upper and lower sub scanning electrodes 1009 and 1010 will be described in further detail with reference to FIG. 11. The reference numerals the same as those in FIG. 10 indicate the same members or areas.

The plan shape of the signal electrode 107 will be described with reference to FIG. 11B. The signal electrode 107 comprises, from the top of FIG. 11B, a strip portion 107 for forming pixels in the main display section 104 shown in FIG. 10A, a rectangular portion 113 for forming pixels in the sub display section 103 shown in FIG. 10A, and a strip portion 114 for connection with a signal electrode driving terminal on the integrated circuit 106, and the respective portions are interconnected by narrow paths. Each portion has the same width, but the width may be made different for each portion. The width of each narrow path is 10 μm.

The plan shapes of the upper and lower sub scanning electrodes 1009 and 1010 will be described in detail with reference to FIG. 1C. The upper sub-scanning electrode 1009 comprises a comb-shaped electrode formed with a plurality of rectangular protrusions, protruding downwardly like the teeth of a comb, from a wiring electrode portion of the upper sub-scanning electrode 1009 which extends along the latitudinal direction of the signal electrodes 107. Likewise, the lower sub scanning electrode 1010 comprises a comb-shaped electrode formed with a plurality of rectangular protrusions, protruding upwardly like the teeth of a comb, from a wiring electrode portion of the lower sub-scanning electrode 1010. The comb-shaped electrode of the upper sub-scanning electrode 1009 and the comb-shaped electrode of the lower sub-scanning electrode 1010 are arranged alternating with each other in interleaving fashion in the horizontal direction. The width of each comb-shaped electrode tooth is approximately equal to the width of the signal electrode 107, and the length is also approximately equal to the length of the rectangular portion 113 of the signal electrode 107 in the sub-display section 103.

Next, referring to FIG. 11A, a description will be given of the display pixels formed where the signal electrodes 107 overlap the main scanning electrodes 108 and the upper and lower sub scanning electrodes 1009 and 1010 in the two-dimensional plane. In the figure, the signal electrodes 107 are indicated by solid lines, and the main scanning electrodes 108 and the upper and lower sub scanning electrodes 1009 and 1010 by dashed lines. The pixels in the main display section 104 are square-shaped regions formed at the intersections between the main scanning electrodes 108 and the signal electrodes 107, and are arranged in a matrix pattern. As the signal electrodes 107 are displaced from the comb-shaped electrodes by a half pitch in the latitudinal direction, a rectangular region 111 overlapping the comb-shaped electrode of the upper sub display electrode 109 and a rectangular region 112 overlapping the lower sub scanning electrode 1010 are formed on the rectangular portion of each signal electrode 107 in the sub display section 103. The respective regions 111 and 112 are pixels in the sub display section 103.

First, a liquid crystal panel was experimentally produced with the electrode structure of the first embodiment employed for the display section, and with the integrated circuits of the eighth embodiment mounted adjacent to the main display section. Generally, in the liquid crystal panel according to the present invention, as the area of each sub scanning electrode is significantly larger than the area of each main scanning electrode, the capacitive load of each sub scanning electrode significantly increases (by a factor of 20 to 40) compared with the capacitive load of each scanning electrode. Further, in the first experimental product, as the integrated circuits had to be connected to the upper and lower sub scanning electrodes by long thin wiring lines, the resistance of the wiring to the sub-scanning electrodes increased. As a result, because of the large wiring resistance and the large capacitive load, the driving voltage to the sub display section was attenuated by about 0.2 V compared with the driving voltage to the main display section, and a situation occurred where the sub display section could not be driven to produce a display while the main display section could be driven properly to produce a display. This problem has been solved by properly setting the conditions, such as reducing the resistance of the interconnecting wiring, lowering the driving frequency (reducing the response speed of the liquid crystal material), and selecting a liquid crystal material having a steep T-V characteristic (the relationship between the transmittance and the root mean square value of the applied voltage).

The eighth embodiment has been devised by conducting a series of studies aimed at eliminating the above constraints. In the eighth embodiment, the resistance of the wiring to the upper and lower sub-scanning electrodes 1009 and 1010 can be reduced because the driving integrated circuits 106 are mounted adjacent to the sub display section 103. This serves to reduce the amount of attenuation of the driving voltage and, thereby, to eliminate the above constraints that require reducing the wiring resistance, lowering the driving frequency, and selecting a liquid crystal material having a steep T-V characteristic.

Generally, the reduction of the wiring resistance is accomplished by increasing the thickness of the transparent electrodes but, in the case of a display apparatus having a reflective function, this method entails a reduction in reflectance. In contrast, since the eighth embodiment allows the use of a wiring material having a relatively high resistance, the reflectance can be increased. Further, in the eighth embodiment, the signal electrodes 107 and the interconnecting wiring lines 1011 and 1012 are arranged as shown in FIG. 10B. In the area 100, the signal electrodes 107 have oblique wiring portions. On the other hand, the interconnecting wiring lines 1011 and 1012 are bent at approximately 90°. As a result, the area 100 has regions at its left and right edges where neither the signal electrodes 1087 nor the interconnecting wiring lines 1011 and 1012 are formed. Here, the interconnecting wiring lines for the sub scanning electrodes 1009 and 1010 are increased in width to reduce the wiring resistance. In this way, in the eighth embodiment, the extended area 100 of the bottom glass 101 has a region (space) where no wiring patterns are formed between the signal electrodes 107 and the interconnecting wiring lines 1011; therefore, of the interconnecting wiring lines 1011, the wiring lines connecting to the upper and lower sub-scanning electrodes 1009 and 1010 are made wider than the other wiring lines by using this region, to further reduce the wiring resistance.

In the present embodiment, the integrated circuits, each capable of driving both the scanning electrodes and the signal electrodes by a single chip, have been mounted on the glass; here, it should be noted that the point of the invention to be achieved by this embodiment is to minimize the wiring resistance between the driving signal supply source and the sub scanning electrodes in the liquid crystal panel. Therefore, if the terminal electrodes, at which the driving signals to the scanning electrodes and the signal electrodes are received, are to be provided only on one side of the liquid crystal panel, the terminal electrodes should be provided on the sub-display section side, as in the sixth embodiment. This method serves to reduce the resistance of the wiring to the sub-scanning electrodes, thus reducing the amount of attenuation of the driving signals. The above description has been given by dealing with the method that mounts the integrated circuits on the glass substrate (the method known as chip-on-glass or COG), but other mounting methods may be used, in which case also, similar effects to those achieved by the present invention can be obtained. These other methods include: a method that mounts an integrated circuit on a flexible film-like substrate (called the flexible printed circuit or FPC), and connects the wiring lines on this substrate to the terminal electrodes on the liquid crystal panel (the method known as chip-on-film or COF); a method that mounts an integrated circuit on a rigid circuit board, and connects between the liquid crystal panel and the circuit board by using a flexible film-like substrate (the method known as chip-on-board or COF); and a method that mounts an integrated circuit on a tape-like substrate (the method known as tape automated bonding or TAB).

Other than the reduction of the wiring resistance, the eighth embodiment has the feature of facilitating the etching for forming the electrode patterns and the alignment of the top and bottom glasses 101 and 102, because the shapes of the sub scanning electrodes 1009 and 1010 are simplified compared with the first embodiment.

What is claimed is:

1. A display apparatus which comprises an electro-optical conversion material placed between a plurality of signal electrodes and a plurality of scanning electrodes, and which produces a display by changing optical properties of said electro-optical conversion material by applying a prescribed voltage to each of a plurality of display pixels formed where said signal electrodes overlap said scanning electrodes, wherein said plurality of display pixels are divided on each of said signal electrodes into at least two groups, one consisting of main display pixels and the other consisting of sub-display pixels, said main display pixels are arranged one spaced apart from another in a direction in which said scanning electrodes are scanned, at least two of said sub-display pixels are arranged in the direction in which said scanning electrodes are scanned, and are arranged, one spaced apart from the other, in a direction orthogonal to the direction in which said scanning electrodes are scanned, said scanning electrodes are divided into two groups, one consisting of main scanning electrodes arranged in a main display section where said main display pixels are formed and the other consisting of sub-scanning electrodes arranged in a sub-display section where said sub-display pixels are formed, said sub-scanning electrodes include at least an upper sub-scanning electrode and a lower sub-scanning electrode, said upper and lower sub-scanning electrodes each comprising wiring electrode portions extending parallel to each other in the direction orthogonal to said scanning direction and a plurality of comb-shaped electrode portions protruding from the respective wiring electrode portions of said upper and lower sub-scanning electrodes in directions opposing each other, and said comb-shaped electrode portions of said upper sub-scanning electrode and said comb-shaped electrode portions of said lower sub-scanning electrodes are arranged in alternating fashion in the direction orthogonal to said scanning direction.

2. A display apparatus as claimed in claim 1, wherein each of said signal electrodes comprises a main signal electrode portion on which said main display pixels are formed, and sub-signal electrode portions connected to said main signal electrode portion and arranged one spaced apart from the other in the direction orthogonal to said scanning direction in corresponding relationship to said sub display pixels.

3. A display apparatus as claimed in claim 1, wherein said sub-signal electrode portions are connected to said main signal electrode portion by a portion formed in the shape of a narrow path.

4. A display apparatus as claimed in claim 2, wherein said sub-signal electrode portions are connected to said main signal electrode portion by a portion formed in the shape of a narrow path.

5. A display apparatus as claimed in claim 1, wherein said scanning electrodes forming said sub-display pixels include a middle sub-scanning electrode in addition to said upper sub-scanning electrode and said lower sub-scanning electrode, and wherein said middle sub-scanning electrode is disposed between said upper sub-scanning electrode and said lower sub-scanning electrode, and is formed in a corrugated shape to conform with the shapes of said upper sub-scanning electrode and said lower sub-scanning electrode.

6. A display apparatus as claimed in claim 1, wherein said electro-optical conversion material is a liquid crystal material.

7. A display apparatus as claimed in claim 2, wherein said electro-optical conversion material is a liquid crystal material.

8. A display apparatus as claimed in claim 1, wherein interconnections for connecting said scanning electrodes and said signal electrodes to an external circuit that applies a prescribed voltage between said electrodes are provided on one side of a display substrate, and said one side of said substrate is located on a sub-display pixel side.

9. A display apparatus as claimed in claim 2, wherein interconnections for connecting said scanning electrodes and said signal electrodes to an external circuit that applies a prescribed voltage between said electrodes are provided on one side of a display substrate, and said one side of said substrate is located on a sub-display pixel side.

* * * * *